(12) United States Patent
Pang et al.

(10) Patent No.: US 11,181,805 B2
(45) Date of Patent: Nov. 23, 2021

(54) LIGHTING SYSTEM AND IMAGING METHOD USING INCOHERENCE LIGHT

(71) Applicants: Stanley Electric Co., Ltd., Tokyo (JP); LinOptx, LLC, San Diego, CA (US)

(72) Inventors: Lin Pang, San Diego, CA (US); Tomofumi Yamamuro, San Diego, CA (US)

(73) Assignees: STANLEY ELECTRIC CO., LTD., Tokyo (JP); LINOPTX, LLC, San Diego, CA (US)

( * ) Notice: Subject to any disclaimer, the term of this patent is extended or adjusted under 35 U.S.C. 154(b) by 134 days.

(21) Appl. No.: 16/708,609

(22) Filed: Dec. 10, 2019

(65) Prior Publication Data

US 2020/0238896 A1 Jul. 30, 2020

Related U.S. Application Data

(60) Provisional application No. 62/797,366, filed on Jan. 28, 2019, provisional application No. 62/797,363, filed on Jan. 28, 2019.

(51) Int. Cl.
*G02F 2/02* (2006.01)
*G02F 1/01* (2006.01)
(Continued)

(52) U.S. Cl.
CPC ............ *G02F 2/02* (2013.01); *B60Q 1/1407* (2013.01); *B60Q 1/1423* (2013.01); *B60Q 1/20* (2013.01);
(Continued)

(58) Field of Classification Search
CPC ........... B60Q 1/14–143; B60Q 1/18–20; F21S 41/12–16; F21S 41/60–698; F21V 9/08;
(Continued)

(56) References Cited

U.S. PATENT DOCUMENTS

2015/0009695 A1  1/2015  Christmas et al.
2018/0302542 A1  10/2018  Masumura

FOREIGN PATENT DOCUMENTS

JP     2019-027974 A    2/2019
JP     2019-092088 A    6/2019

OTHER PUBLICATIONS

Extended European search report dated Mar. 23, 2021, in corresponding European patent Application No. 20212289.1, 8 pages.

*Primary Examiner* — Jason M Han
(74) *Attorney, Agent, or Firm* — Xsensus LLP

(57) ABSTRACT

A lighting system includes a light source having a broad emission spectrum, a spatial light modulator configured to modulate one or more of phase and amplitude of light irradiated from the light source to a target object, and a detector configured to detect light intensity being reflected from the target object. Additionally, the lighting system includes circuitry configured to divide an emission spectrum of light irradiated from a light source into a plurality of wavelength ranges, measure irradiated light formed with a first wavelength range to the target object, calculate a transmission matrix based on the measurement, calculate a set of other transmission matrixes, calculate a set of patterns for generating a plurality of localized illuminations, drive the spatial light modulator by a modulation signal which forms an irradiation pattern, and scan the plurality of localized illuminations on the target object.

18 Claims, 19 Drawing Sheets

(51) Int. Cl.
| | |
|---|---|
| *F21S 41/16* | (2018.01) |
| *F21S 41/125* | (2018.01) |
| *F21S 41/60* | (2018.01) |
| *F21V 9/30* | (2018.01) |
| *B60Q 1/14* | (2006.01) |
| *F21V 9/08* | (2018.01) |
| *F21V 9/14* | (2006.01) |
| *F21V 14/00* | (2018.01) |
| *H04N 5/225* | (2006.01) |
| *G01S 17/04* | (2020.01) |
| *B60Q 1/20* | (2006.01) |
| *G01N 21/47* | (2006.01) |
| *G01S 17/10* | (2020.01) |
| *F21Y 115/30* | (2016.01) |
| *F21Y 115/10* | (2016.01) |
| *F21W 102/20* | (2018.01) |

(52) U.S. Cl.
CPC ............. *F21S 41/125* (2018.01); *F21S 41/16* (2018.01); *F21S 41/60* (2018.01); *F21V 9/08* (2013.01); *F21V 9/14* (2013.01); *F21V 9/30* (2018.02); *F21V 14/003* (2013.01); *G01N 21/4795* (2013.01); *G01S 17/04* (2020.01); *G01S 17/10* (2013.01); *G02F 1/0105* (2013.01); *H04N 5/2256* (2013.01); *F21W 2102/20* (2018.01); *F21Y 2115/10* (2016.08); *F21Y 2115/30* (2016.08); *G02F 2203/12* (2013.01); *G02F 2203/50* (2013.01)

(58) Field of Classification Search
CPC ............. F21V 9/14; F21V 14/00–003; F21W 2102/20; F21Y 2115/10; F21Y 2115/30; G01N 21/4795; G01S 17/04–10; G02F 1/0105; G02F 2/02; G02F 2203/12; G02F 2203/50; H04N 5/2256
See application file for complete search history.

LIGHTING SYSTEM AND IMAGING METHOD USING INCOHERENCE LIGHT

CROSS-REFERENCE TO RELATED APPLICATION

This application claims the benefit of U.S. Provisional Application No. 62/797,363, filed Jan. 28, 2019, and U.S. Provisional Application No. 62/797,366, filed Jan. 28, 2019, which are incorporated herein by reference in their entirety. Additionally, this application is related to, which are incorporated herein by reference in their entirety.

BACKGROUND

Many applications involve transmitting light through scattering media such as fog, rain, snow, dust, and/or pollution. For example, a vehicle driving on the road and navigating through traffic may also have to operate in one or more of these scattering media. Similarly, for planes at an airport, underwater communication, tissues in biological imaging, and the like, vision can be affected by the scattering processing of the media. When attempting to image through these scattering media, there are several adverse effects. For example, images get dimmer due to the absorptions, heavy scattering of the light causes light to be scattered into other paths instead into the receiver or human eyes, and images get distorted due to wave front distortion from the target objects by the nonuniform scattering media. Additionally, image contrast gets lowered due to strong backscattering by the scattering media and weak signal information acquired from the target object behind the scattering media. For example, this can often happen in traffic during heavy fog, rain, or snow conditions where the driver's vision is affected and objects like traffic signs, roadside marks, pedestrians, and the like are more difficult to see.

In order to see the objects more clearly, the driver often increases the illumination by switching on the high-power headlamps (i.e., high beams). However, instead of observing clearer traffic signs by using the high beams, the driver sees a bright glare, in front of the driver's car due to the strong backscattered light by the water particles in the air. This can also be referred to as backscattered noise. The backscattered noise makes it even more difficult for the driver to see, which can put the driver in dangerous driving situations that put the driver and others at risk. Subsequent consequences can include an economic impact in already poor weather conditions by shutting down the highways, for example. This problem also greatly affects the deployment of autonomous vehicles due to the unsolved issues for robustly imaging through scattering media.

Various techniques for scattering processing control via the spatial light modulator have been proposed. However, to control the light through the scattering processing, the optical source should have a high spatial coherence. When a laser source is used, its spatial coherence is across the wave front. Typically, to have a high incident power into the scattering medium, a laser diode (LD) or light emitting diode (LED), especially a multimode laser diode, is employed. However, the LD is not guaranteed to have a high enough spatial coherence across the surface of the modulator. Further, when a white light source is used, which is a practical light source for common applications including a vehicle headlight, the required spatial coherence is even more difficult to reach because the light from a confined space must travel farther to reach the required spatial coherence.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a lighting system includes a light source having a broad emission spectrum, a spatial light modulator configured to modulate one or more of phase and amplitude of light irradiated from the light source to a target object, and a detector configured to detect light intensity being reflected from the target object. Additionally, the lighting system includes circuitry configured to divide an emission spectrum of light irradiated from a light source into a plurality of wavelength ranges, measure irradiated light formed with a first wavelength range to the target object, calculate a transmission matrix based on the measurement, calculate a set of other transmission matrixes, calculate a set of patterns for generating a plurality of localized illuminations, drive the spatial light modulator by a modulation signal which forms an irradiation pattern, and scan the plurality of localized illuminations on the target object.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
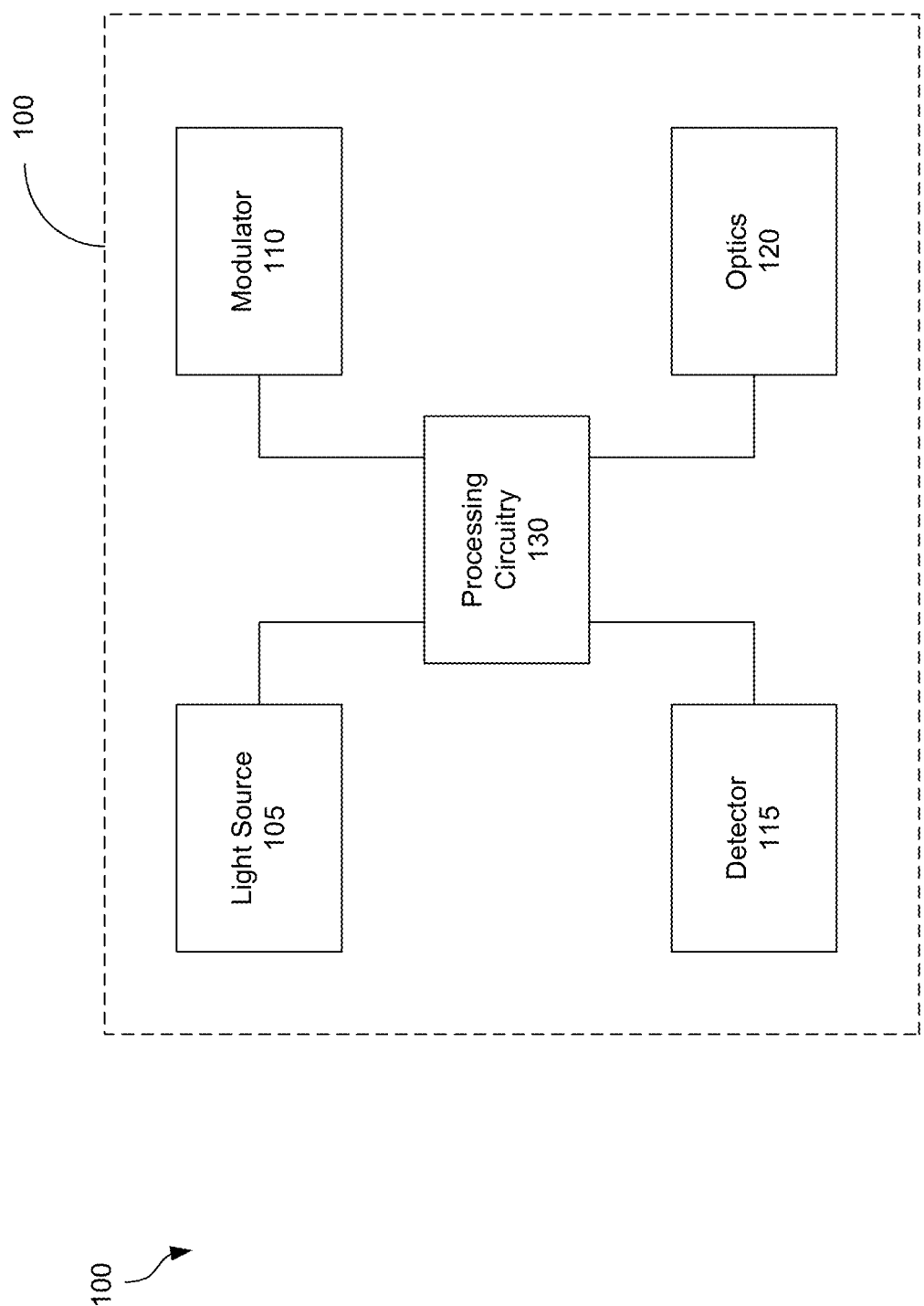
FIG. 1 illustrates an exemplary adaptive illumination imaging system according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

Referring now to the drawings, wherein like reference numerals designate identical or corresponding parts throughout the several views:

FIG. 1 illustrates an exemplary adaptive illumination imaging system 100 (herein referred to as the system 100) according to one or more aspects of the disclosed subject matter. As will be discussed in more detail later, one or more methods according to various embodiments of the disclosed subject matter can be implemented using the system 100 or portions thereof. Put another way, system 100, or portions thereof, can perform the functions or operations described herein regarding the various methods or portions thereof (including those implemented using a non-transitory computer-readable medium storing a program that, when executed, configures or causes a computer to perform or cause performance of the described method(s) or portions thereof).

The system 100 can include a light source 105, a modulator 110, a detector 115, optics 120, and processing circuitry 130 (which can include internal and/or external memory). Further, the aforementioned components can be electrically connected or in electrical or electronic communication with each other as diagrammatically represented by FIG. 1, for example. In one or more aspects of the disclosed subject matter, the system 100 including the light source 105, the modulator 110, the detector 115, the optics 120, and the processing circuitry 130 can be implemented as various apparatuses that perform imaging through a scattering medium. For example, the system 100 can be a headlight of a vehicle (or an autonomous vehicle) where the headlight can adapt to fog (and/or other scattering media). As a result, the vehicle and/or autonomous vehicle can more clearly image the road and/or target objects ahead in and through the fog, thus improving the driver's vision and/or the autonomous driving capability in the scattering medium. Additionally, in another embodiment, the system 100 can be an apparatus for real-time in vivo imaging through biological tissue, in which the system 100 can overcome the dynamic scattering processing caused by the physiological environment.

The light source 105 can represent one or more light sources in the system 100. For example, the light source 105 can be a laser diode, a light-emitting device (LED), an array of laser diodes, an array of LEDs, and the like. In one embodiment, the light source 105 can be used as a headlamp of a vehicle.

The modulator 110 can represent one or more modulators in the system 100. The modulator can be a spatial light modulator (SLM). For example, the modulator 110 can be a Digital Micromirror Device (DMD) which can include a plurality of micromirrors arranged in a matrix. Further, additional modulators can be included in the system 100. For example, the protective covering of a headlight can act as a passive modulator and can be accounted for in the various calculations for imaging a target object in and/or through the fog.

The detector 115 can represent one or more detectors in the system 100. In one or more aspects of the disclosed subject matter, the detector 115 can be an imaging device. Although other types of detectors can be contemplated, imaging device, image capturer, detector, receiver, and the like can be used interchangeably herein. In one embodiment, the detector 115 can include a first detector and a second detector. The first detector can be configured to detect the light intensity reflected by a target object irradiated from the light source, and the second detector can be configured to only detect light intensity of the first wavelength range which is reflected by the target object.

Figure 2A:
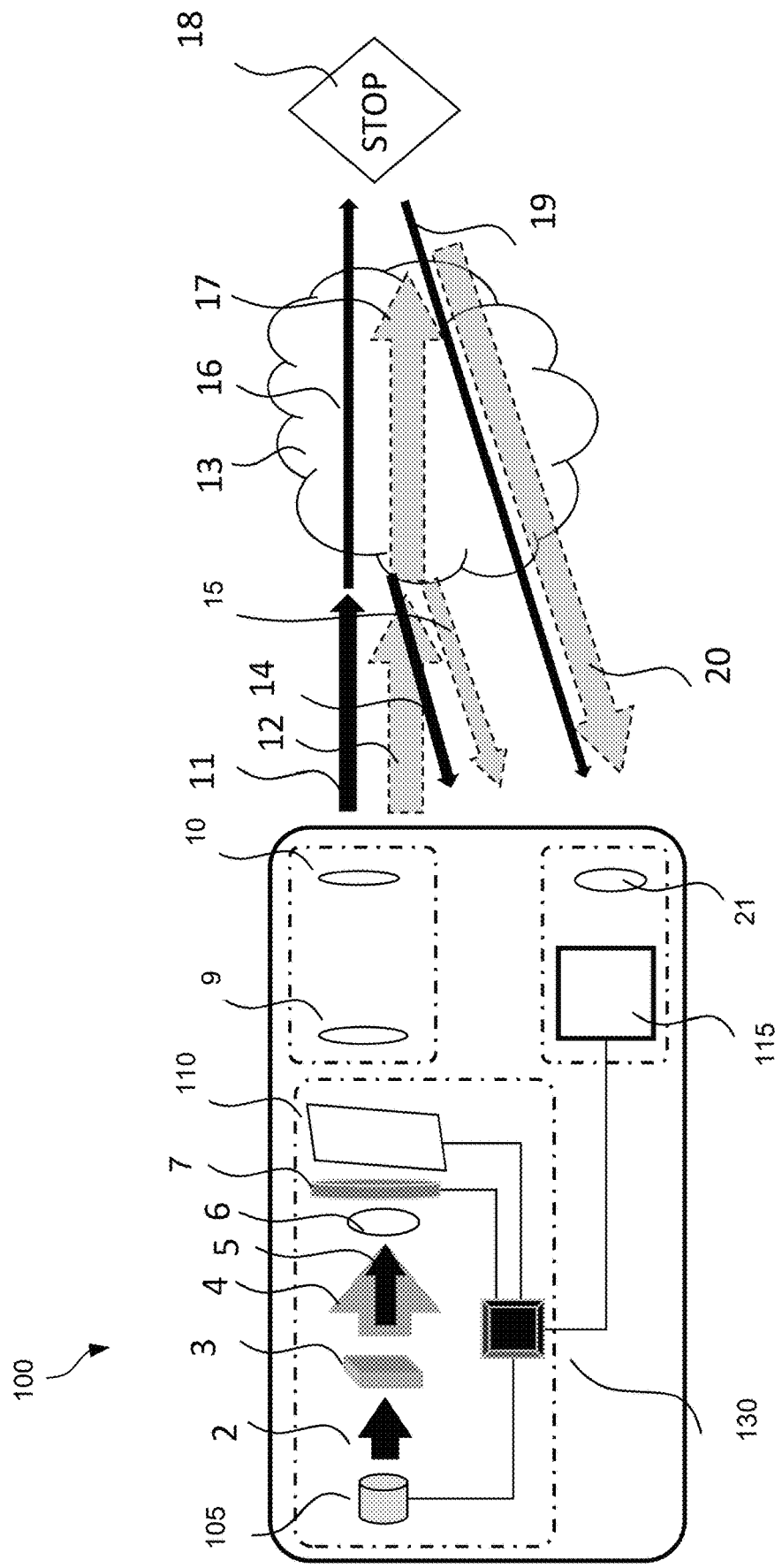
FIG. 2A illustrates an exemplary schematic diagram of the system for white light modulation according to one or more aspects of the disclosed subject matter.

The optics 120 can represent various optical components included in the system 100. For example, the optics 120 can include a phosphor plate, projection optics, imaging optics, lenses, mirrors, filters, and the like. Each of the components included in the optics 120 can be disposed in various configurations in the system 100. For example, in one aspect, the optics 120 can be disposed as illustrated in FIG. 2A. Further, one or more of the optics 120 (e.g., a spectral filter) can be electrically connected or in electrical or electronic communication with the other portions of the system 100 via the processing circuitry 130, but it should be appreciated that not all of the optics 120 are or have to be electrically connected to other portions of the system 100.

The processing circuitry 130 can carry out instructions to perform or cause performance of various functions, operations, steps, or processes of the system 100. In other words, the processor/processing circuitry 130 can be configured to receive output from and transmit instructions to the one or more other components in the system 100 to operate the system 100 to image one or more target objects in and/or through a scattering medium.

Generally, white light generated in both natural and artificial processes lacks a degree of spatial coherence such that it could not be used for phase or amplitude modulation to control the light through a scattering medium, such as imaging objects through fog and in deep tissue imaging, for example. Spatial coherence is a measure of the correlation of a light wave's phase at different points transverse to the direction of propagation, which can correspond to how uniform the phase of a wave front is. Temporal coherence is a measure of the correlation of a light wave's phase at different points along the direction of propagation, which can correspond to how monochromatic a source is. Previously, a laser source with a single longitudinal mode had to be used in such applications, but this makes imaging through the scattering medium very costly. This not only affects the broad employment of scattering medium imaging, but also make it difficult for image improvement through the scattering medium (e.g., fog, rain, snow, etc.) in which the size and the cost of the light source would be critical, and especially the high power for illumination needed in most of the lighting situations. Accordingly, a high-power laser source with well-defined spatial coherence may not be suitable for applications such as vehicles or consumer products. Accordingly, one or more aspects of the disclosed subject matter include techniques to increase illumination power on the scattering medium and more easily acquire the required spatial coherence for the modulation of the scattered light.

Spatial Modulation of Broad Band Light from a Phosphor Plate through the Scattering Medium FIG. 2A illustrates an exemplary schematic diagram of the system 100 for white light modulation according to one or more aspects of the disclosed subject matter. A single line laser source can be used for spatial light modulation to perform phase modulation because the phase modulation operation is wavelength dependent. However, in regular imaging processing, in which white light is usually employed, the white light lacks any spatial coherence without special treatment. Accordingly, the modulation of the broad band source usually is not possible, not to mention trying to perform imaging through the scattering medium. In ordinary life, white light illumination is typically required because the human eye's acceptance to natural white light. Due to the lack of the spatial coherence, no effort has been made in terms of the modulation of the white light, or broad band light source, for application of the evaluation of the transmission matrix, and even imaging of the white light. Accordingly, the following aspects corresponding to the spatial modulation of broad band light from a phosphor plate through the scattering medium describe white light modulation through the scattering medium in terms of transmission matrix evaluation by the single line source and application on the white light for the imaging enhancement through the scattering medium.

Additionally, FIG. 2A illustrates an exemplary scenario where the system 100 can image a target object in and/or through the fog. For example, the light source 105, which can be a laser diode, an LED, an array of laser diodes, an array of LEDs, and the like, can emit blue light 2 through a phosphor plate 3. Fluorescent light 4 emitted from the phosphor plate 3 and blue light residue 5 left after the phosphor plate can travel through an expansion and collimation optical system 6 and a spectral filter 7 to the modulator 110. The fluorescent light 4 and the blue light residue 5 travel through (or are reflected from, depending on the type of modulator) the modulator 110 and continue through projection optics 9 and imaging optics 10. It should be appreciated that projection optics 9 and imaging optics 10 are exemplary as more and/or less of each can be used to irradiate white light to the target object. The light then leaves the system 100 as a blue light component 11 and a fluorescent light component 12 (e.g., yellow light) and enters a scattering medium 13 (e.g., fog, rain, snow, etc.). A blue light component 14 and a fluorescent light component 15 are reflected by the scattering medium 13 back toward the system 100 and enter a light collection system 21. A blue light component 16 and a fluorescent light component 17 pass through the scattering medium 13 to a target object 18 and a reflected blue light component 19 and a reflected fluorescent light component 20 are reflected from the target object 18 back toward the system 100 and enter the light collection system 21. After being collected by the light collection system 21, the detector 115 is configured to receive each reflected light component 14, 15, 19, and 20, and the information gathered by the detector 115 is received by the processing circuitry 130.

Here, the coherence of the incident light along the surface of the modulator is the key to the realization of the control after the scattering medium. In other words, although a laser based white light source, RGB, or supercontinuum sources could be readily used in phase or amplitude modulation because of the well-defined spatial coherence, the industry laser safety requirement puts an intensive restriction for laser use in light illumination. Accordingly, the fluorescence based white light is currently an industrial standard for lighting applications. However, the lack of the spatial coherence of the white light makes light modulation (phase or amplitude modulation) difficult and/or impossible. Therefore, as shown in FIG. 2B, modulating a phosphor plate based white light by specially designing the white light generation and configuration can be used.

Figure 2B:
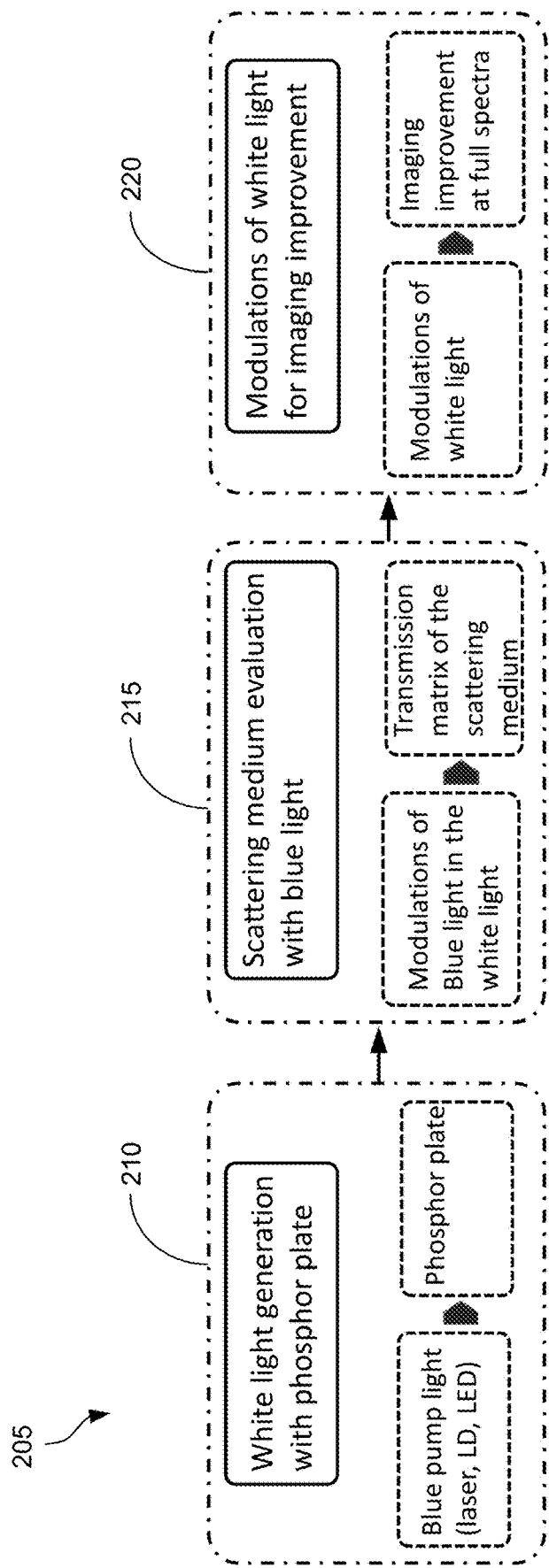
FIG. 2B illustrates an exemplary workflow for white light modulation according to one or more aspects of the disclosed subject matter.

FIG. 2B illustrates an exemplary workflow 205 for white light modulation according to one or more aspects of the disclosed subject matter. The workflow 205 can include generation 210, evaluation 215, and imaging 220. Regarding the generation 210, white light can be generated with a phosphor plate. More specifically, the blue pump source can be configured to excite the phosphor plate, and the generated fluorescent light, usually yellow in spectral range, can be combined with the blue pump light to form collimated white light to project on the modulator 110. The size of the blue pump light illuminated on the phosphor plate or illumination configuration and the distance away from the phosphor plate can be defined to get a required spatial coherence along the modulator 110 (e.g., a spatial light modulation (SLM) or digital micromirror device (DMD)). Regarding the evaluation 215, the scattering medium can be evaluated with blue light. More specifically, the component of the blue pump light in the white light can be modulated to illuminate onto the scattering medium or the white light can modulated while the detector is only detecting the blue light component signal reflected or backscattered from the target object 18 behind the scattering medium 13. By comparing the detected blue component signals to the modulated incident patterns, the properties of the scattering medium, as well as the optical system, the transmission matrix can be evaluated. Regarding the imaging 220, the modulations of white light can improve imaging. More specifically, the evaluated transmission matrix can be employed to acquire the optimized phase or amplitude modulation patterns for the spectral components in the fluorescent light to achieve the focusing in the scattering medium, which improves the imaging through the scattering medium when employed on the modulator 110, such as SLM or a DMD, for example.

Figure 3:
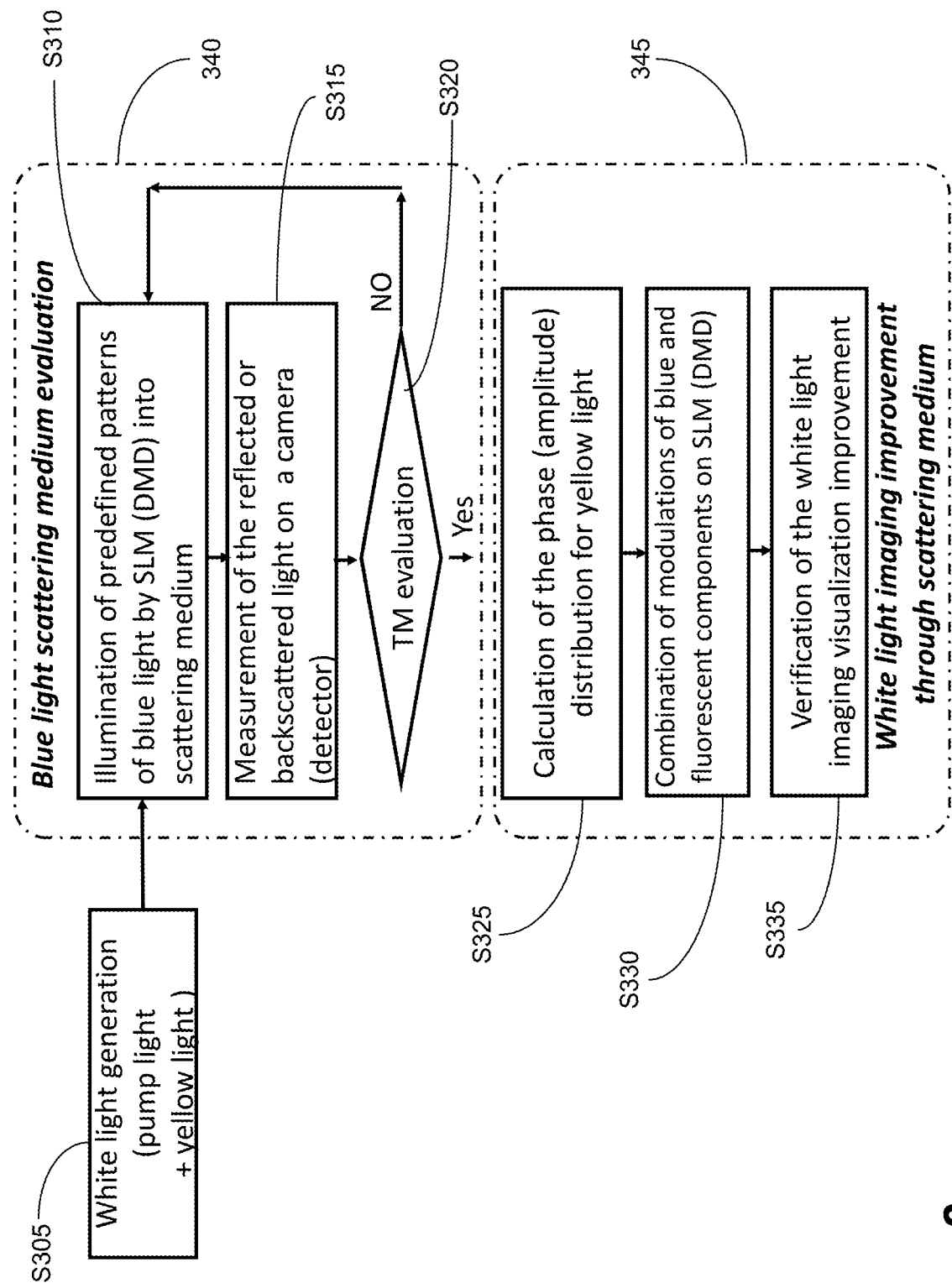
FIG. 3 is an algorithmic flow chart of a method for improving imaging through a scattering medium according to one or more aspects of the disclosed subject matter.

FIG. 3 is an algorithmic flow chart of a method for improving imaging through a scattering medium according to one or more aspects of the disclosed subject matter.

In S305, the system 100 can be configured to generate white light. For example, the white light can be a combination of pump light (e.g., from the light source 105) and yellow light. Next, S310, S315, and S320 are processing steps corresponding to blue light scattering medium evaluation 340.

In S310, the system 100 can be configured to illuminate predetermined patterns of blue light into a scattering medium (e.g., scattering medium 13). The predetermined patterns can be generated by the modulator 110, for example.

In S315, the system 100 can be configured to determine if a transmission matrix can be evaluated. In response to a determination that the transmission matrix is not evaluated, the process can return to S310 to continue illuminating predetermined patterns of blue light into the scattering medium 13. However, in response to a determination that the transmission matrix is evaluated, the process can continue to improve white light imaging through the scattering medium (345), which includes S325, S330, and S335.

In S325, the system 100 can be configured to calculate the phase (amplitude) distribution for the yellow light.

In S330, the system 100 can be configured to combine modulation of blue and fluorescent components. The combination can be performed via a spatial light modulator, for example.

In S335, the system 100 can be configured to verify the white light imaging visualization improvement. For example, to detect a visually improved image with a detector (e.g., detector 115), the verification of the visualization improvement can be a confocal imaging process for both blue and yellow lights. In the case that localized illuminations of blue and yellow are not completely overlapped on the surface of the target, a confocal image process can work because a general color detector like a camera is able to distinguish three colors with separate light receiving cells and an improved white light imaging visualization improvement can be generating using that data in the process. In other words, for white light illumination, localized illuminations for red (R), green (G) and blue (B) spectral components can be formed at the same locations on the target objects, and confocal images for these spectral components can achieve the visualization improvement for the white light illumination. In another example, if human's eyes are employed to detect the localized illumination (or improved image of the target), the localized illumination(s) along the target surface can be scanned at a very fast speed so a human brain can combine each scene and create one image which has localized illuminations on the entire target area. After verification, the process can end.

The following description provides further detail for phosphor plate white light generation, evaluating a transmission matrix with blue light, spatial coherence of broad band light, light absorption in phosphor plate, spatial coherence of fluorescent light generated by laser diode (LD) and light emitting diode (LED), and phase modulation of the broad band light selected from the fluorescent, where each section is identified by a corresponding header.

Phosphor Plate White Light Generation:

Currently a blue LED as a pump source and phosphor material based white light lighting systems have been broadly employed in indoor, outdoor, and headlamp lighting devices and systems due to their advantages on the cost, volume, and design flexibility. The phosphor (YAG:Ce3+ Polycrystalline) can be powder or thin film, for example, making it flexible to apply on any surface. The luminescence center of the phosphor that absorbs the light energy becomes an excitation state which can emit light from the excitation state by wavelength corresponding to the energy at the normal state (e.g., stable state). The phosphor contains an element at the luminescence center that emits light to the host crystal. The luminescence center can be influenced from the electron of the host crystal to emit light easily. The emission spectrum and wavelength can be different depending on the element of the luminescence center. In industry application, pump light source is usually InGaN blue LED 450-460 nm, and phosphor is YAG Phosphor $Y3Al5O12$: Ce3+. The lighting system has advantages of low cost in terms of the power generation (e.g., an LED could emit a few watts of power), high efficiency (e.g., the quantum efficiency (i.e., how much converted into electrons when a photon is absorbed by the phosphor) could be more than 90%), and a wide spectrum (e.g., it covers the spectral range of 400 nm-700 nm).

White light is not a single wavelength. It is the sum of multiple, distinct portions of the visible spectrum. There are many ways to add colors of "pure" light to make white light. One of the most common man-made sources of white light is black-body radiation. Similarly, incandescent bulbs generate their glow by passing current across a metal element until it heats up and radiates. Yet, while black-body radiation is an effective means of producing white light, it is very energetically inefficient (most of the energy input is used to produce infrared light/heat). A much more efficient means of creating white light is to combine a few specific wavelengths of the visible spectrum. The color combinations that produce white light are depicted in a CIE color diagram.

Various colors in a CIE color diagram can be thought of as "pure" because they're defined by a specific wavelength of light between 380 and 700 nm. All colors inside the border as well as along the bottom of a CIE color diagram are created when two or more "pure" colors are combined. White light is at the "center" of the CIE diagram (e.g., x=0.33 and y=0.33).

To make white light, manufactures incorporate blue (x=0.1666, y=0.0089), green (x=0.2738, y=0.7174), and red (x=0.7347, y=0.2653) emitting molecules in the screen design. For phosphor based white light generation, white light is created by summing the emissions of blue and yellow emitting molecules. The blue component comes from the blue light while the yellow light component comes from the fluorescent light emitted by the phosphor plate YAG:Ce3+ excited (pumped) by the blue light.

Figure 4A:
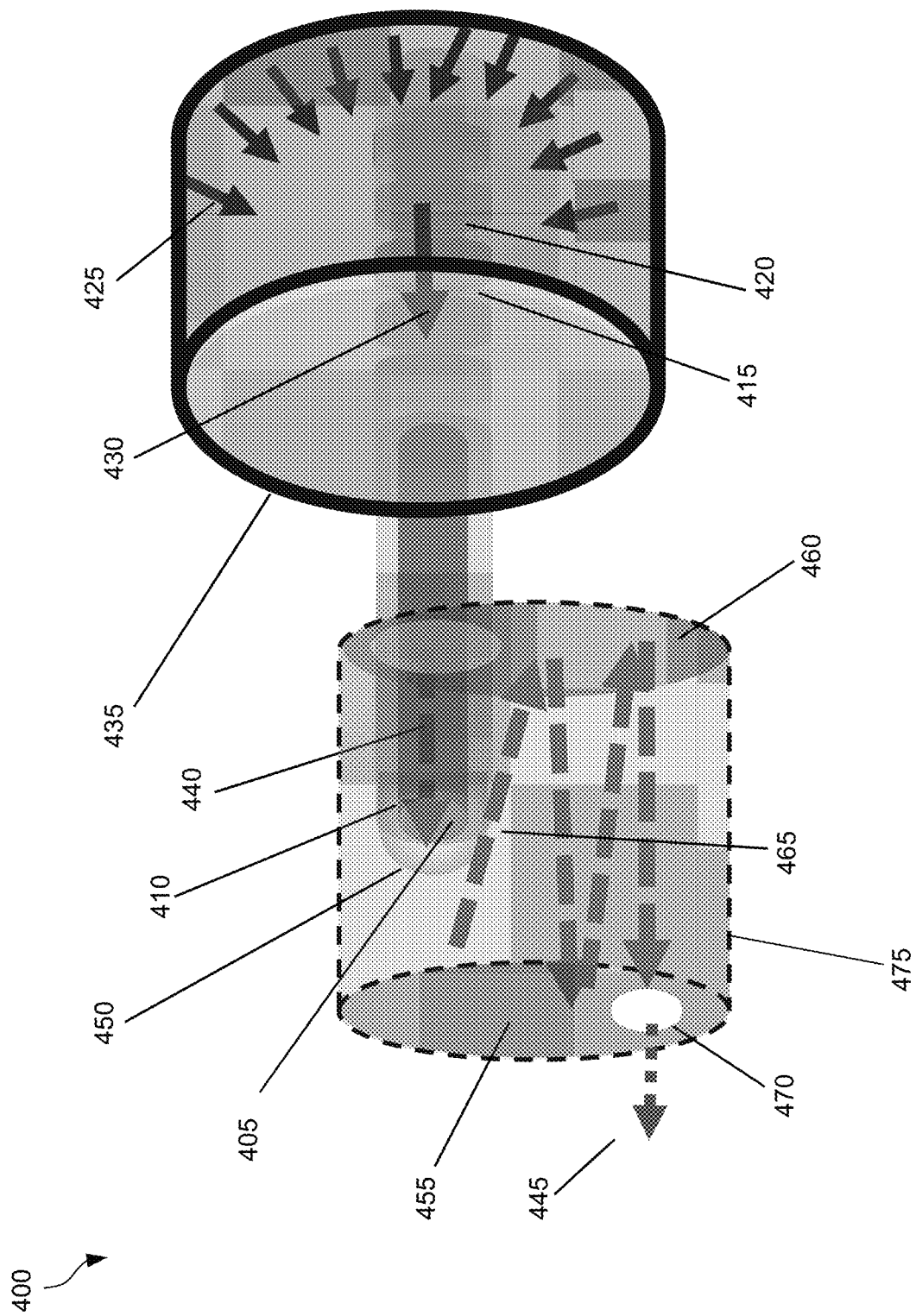
FIG. 4A illustrates an exemplary light source according to one or more aspects of the disclosed subject matter.

Depending on the blue light pumping and blue-yellow combination configurations, phosphor plate based white light generation can be categorized as follows:

a): The blue component in the white light can come from the pumping residue, and the pump light focuses on the phosphor plate. Adjusting the thickness of the phosphor plate and the pump power can realize the white light illumination. In this configuration, the thickness of the phosphor plate and the pump power are the parameters to adjust the color temperature.

b): The blue component in the white light comes from the addition of the pumping light so that another path of the blue light combines with the yellow light behind the phosphor plate. In this configuration, only the power of the combined blue light is adjusted to realize the white light illumination.

c): A phosphor waveguide configuration uses a phosphor waveguide based light source, as illustrated in FIG. 4A, in which more configurations can be used to form white light with various designs.

Because the natural white light has certain spectral components within the range in 400 nm-700 nm, proper components should be combined in order to generate the white light which would be comfortable for the human eye. Accordingly, in the configuration of phosphor generated white light, the right weight of blue and fluorescent components should be combined to make the white light.

Transmission Matrix Evaluated with Blue Light:

The pump light can be blue light with a strong spatial coherence or without any coherence. The pump light can be a laser source with single or multi modes (longitudinal or transversal), or a laser diode (single or multimode) or just a light emitting diodes (LED). Any abovementioned sources can be used to pump a phosphor plate to generate white light with enough spatial coherence to be modulated by a spatial light modulator (SLM) (or DMD) to form a localized illuminations after the light passes through the scattering medium as long as the pump configuration (i.e., the illuminated spot size on the phosphor plate and the distance between the phosphor plate and the SLM (or DMD)) is defined properly.

A reason that the light can be manipulated after the scattering medium (e.g., forward scattering focusing behind the scattering medium) is due to the constructive interference among all the light beams passing through the scattering medium. The incident light is divided (e.g., categorized) by the light modulator (SLM, or DMD) into various elements corresponding to groups of the pixels of the modulator called incident channels. Each channel, or element, which includes a few pixels, can be assigned with a defined phase or amplitude. The distribution of the optical field after the light passes through the scattering medium can be described as output channels, $Y_i$, determined by incident channels, $X_k$, after modulation by the scattering medium, described by the transmission matrix, $M_{i,k}$, as follows:

$$Y_i = \Sigma M_{i,k} X_k \qquad (1)$$

When the transmission matrix, M, is evaluated by the series of the inputs and corresponding outputs, the input from the modulator to form any required output optical field distribution or output channels can be evaluated. For example, in order to form a localized illumination at the fifth position on the output optical field, or getting the output optical field (normalized) with the format of Y=[0,0,0,0,1, 0, . . . ], the required input modulation on the modulator would be $$X = M^{-1} Y \qquad (2)$$

On the other hand, when the transmission matrix is evaluated for the scattering medium, not only the transmission matrix can be used to generate the required output optical field by the evaluated modulated input for the optical beam which is used to evaluate the transmission matrix, for example, the transmission matrix can also be used to evaluate the output optical field distribution for other optical beams with different spectral wavelength, spectral bandwidth, and/or intensity distributions if the spatial coherence of the input optical beam is high enough along the modulator surface.

The optical properties of the components can depend on the diffractive index of the optical beam travelling through the components. Therefore, the transmission matrix acquired by the optical beam with the wavelength of $\lambda_1$ can be labeled with the wavelength such as $M(\lambda_1)$. Wavelength dependence of the diffractive index of the scattering medium determines that the evaluated transmission matrix of the scattering medium and its accompanied optical system should also be wavelength dependent, or dispersive.

Therefore, the processing can include a first step corresponding to evaluating the transmission matrix under certain wavelength $\lambda_1$ (for example, blue pump light). Additionally, evaluation can include modulating the incident light of wavelength $\lambda_1$, acquiring the corresponding output optical field through the scattering medium, $Y_i(\lambda_1) = \Sigma M_{i,k}(\lambda_1) X_k(\lambda_1)$, based on the transmission matrix of the system (scattering medium and its accompanied optics) with this wavelength, $M(\lambda_1)$.

Next, the processing can include a second step of acquiring the transmission matrix for the wavelength of interest $\lambda_2$ in the white light range. According to the dispersion relationship (transmission matrix dependence on wavelength), which can be defined beforehand, the transmission matrix at the wavelength of interest $\lambda$ can be deduced by $M(\lambda_2) = a(n) M(\lambda_1)$, where $a(n)$ is a constant depending on refractive index of the scattering index.

Further, the processing can include a third step of calculating the required incident field, $X(\lambda_2)$, for the designed output field $Y(\lambda_2)$, for example, the output field with a localized illumination at certain position, could be calculated as $X(\lambda_2) = M^{-1}(\lambda_2) Y(\lambda_2)$.

For other wavelengths $\lambda_3, \lambda_4, \ldots$, in the spectral range of the white light source, the corresponding transmission matrix, $M(\lambda_3), M(\lambda_4), \ldots$ can be evaluated from the measured transmission matrix $M(\lambda_1)$ via the dispersion relationship. The required incident field, $X(\lambda_3), X(\lambda_4), \ldots$, for the designed output field $Y(\lambda_3), Y(\lambda_4), \ldots$, for example, the output field with localized illuminations at certain positions can be calculated as $X(\lambda_3)=M^{-1}(\lambda_3)Y(\lambda_3)$, $X(\lambda_4)=M^{-1}(\lambda_4)Y(\lambda_4) \ldots$.

The calculated input fields, $X(\lambda_1)$, $X(\lambda_2)$, $X(\lambda_3)$, $X(\lambda_4) \ldots$, can be employed on the modulator to achieve the expected output fields, $Y(\lambda_1), Y(\lambda_2), Y(\lambda_3), Y(\lambda_4) \ldots$, individually. Or the calculated input fields can be employed on the modulator in the same time to achieve the expected output fields for each wavelength simultaneously. In this way, the white light is modulated to achieve the required output field distribution so that the localized illuminations for all spectral components (e.g., wavelength) overlap at the same position.

Additionally, there are various options for white light modulation regarding the execution configuration. The light component (e.g., wavelength) to evaluate the transmission matrix should have the required spatial coherence according to the following:

If the pump light is a blue laser, the spatial coherence of the laser is high enough to acquire the transmission matrix. In the white light generation configuration, in which the blue pump light residue is used as the blue component in the white light, the transparency of the phosphor plate would keep the spatial coherence of the blue light. In other words, the phosphor plate does not scatter the blue light, but absorbs some of the blue light to generate the yellow fluorescent light.

If a single mode laser diode (LD) is used as the pump light, the spatial coherence of the single transverse mode of the LD can provide enough spatial coherence to acquire the transmission matrix of the scattering medium and the accompanied optical system.

If a light emitting diode (LED) is employed as a pump light, the LED blue pump light, due to its poor spatial coherence, could not directly be used to perform the transmission matrix evaluation. Accordingly, the LED light should be treated to acquire enough spatial coherence. For example, the LED light can be focused into a certain size or filtered by a pinhole with a certain size, with some predetermined distance of travel before the spatial light modulator. In another example, the phosphor plate can have small particles inside the plate for scattering the blue and yellow light to get more uniform light distribution.

In some applications, the LD can be a multiple mode LD (with a few transverse modes). Therefore, the light from the LD is not completely spatially coherent. One option is to employ one of the single transverse modes that can be selected to perform the transmission matrix evaluation.

If the LED or the multiple mode LD is the pump light, the spectrally narrowly selected fluorescent light can be used to evaluate the transmission matrix of the system if the spatial coherence of the filtered light is high enough across the modulator.

Spatial Coherence of Broad Band Light:

As further described herein, the spatial coherence of a broad band light, or white light, generated from a phosphor plate pumped by a blue laser, LD, and LED can be evaluated. The visibilities, or contrast, of the interference generated by the double slits can be measured. Additionally, fringe visibilities can be measured by changing the distance between the double slits and the phosphor plate. Further, the size of the pump light on the plate can be changed by varying the distance between the focus optics (e.g., a microscopic objective lens) and the phosphor plate. By measuring the fringe visibilities, the actual size of a phosphor plate emitter can be induced. The size of the emitter and the distance from the emitter can determine the size of the spatial coherence of the fluorescent light.

Spatial coherence is a concept of wave disturbance describing the correlation between one point to another on a wave front surface. It is a mutual interdependence or connection of variable wave quantities of two different points in a given instant of time. In other words, spatial coherence is concerned with the phase correlation of waves in different observation points. Temporal coherence entails the phase correlation of waves at a given point in space at two different instances of time.

The generated fluorescent light from the phosphor plate usually lacks temporal coherence because the fluorescent light emitted from phosphor molecules are not synchronized to show correlation at any time. However, the spatial coherence can be managed. The spatial coherence or degree of spatial coherence $\gamma$ can be defined as the visibility $|v|$ of the interference pattern generated by probing double slits after the light of interest passes through. Visibility of the fringe is defined as $$v = \frac{\text{maximal intensity} - \text{minimal intensity}}{\text{maximal intensity} + \text{minimal intensity}},$$

which can be written as, $$|v| = \left| \text{sinc}\left(\frac{\pi dS}{\lambda R}\right) \right| \qquad (3)$$

where, S is the size of the light source, or emitter, d is the distance between the two splits, and R is the distance between the source and the plane where the slits lie. By adjusting the distance between an optical lens (e.g., a microscopic objective lens) and the phosphor plate, the visibility of the fringes from yellow light generated by pumping the YAG:Ce ($Y_3Al_5O_{12}:Ce^{3+}$) phosphor plate can be measured. In one aspect, equation (3) can determine the contrast of the interference fringes formed by the two beams from the elements of the SLM with a distance (d) away. The contrast can be used to define the spatial coherence of the light on the SLM.

Light Absorption in Phosphor Plate:

In the generation of the white light, the blue pump light passes through the phosphor plate, part of the blue light is absorbed by the phosphor plate and converted into yellow fluorescent light, and the rest of the blue light (i.e., the blue residue) is mixed with the yellow fluorescent light forming the white light. On the other hand, the blue light absorption and the yellow fluorescent light emission occur throughout the propagation of the blue light and emitted fluorescent light through the phosphor plate. Accordingly, the spectral composition of the generated white light is based on the absorption of the blue and fluorescent light along the phosphor plate. In the generation of the white light configuration, the blue and yellow light propagate in the phosphor plate based on the Beer-lambert Law, $$P_t = (P_{in} - R)e^{-\alpha T} \qquad (4)$$

where, $P_t$ stands for the transmission of the light, $P_{in}$ incidence of blue light, T the thickness of the phosphor plate, R reflectivity, and α the absorption coefficient, respectively.

Spatial Coherence of Fluorescent Light Generated by Laser Diode (LD) and Light Emitting Diode (LED):

Although other light sources can be contemplated, with respect to a single mode blue laser for pumping the phosphor plate, the single mode laser is a Gaussian distribution of the optical field with complete spatial coherence along the wave plane and the coherent length can be meters. Due to considerations including cost, size and output power, a laser diode having a small size (e.g., typically smaller than a penny), with or without feedback mechanisms giving the single or multiple mode output, can be used as a pump source. Additionally, for similar reasons, even light emitting diodes (LEDs), which have no coherence properties, can be used as the pump source. Therefore, as further described herein, if a LD or a LED can be used to generate white light for the spatial light modulation, the configuration of white light generation and modulation can include various practical applications.

Figure 8:
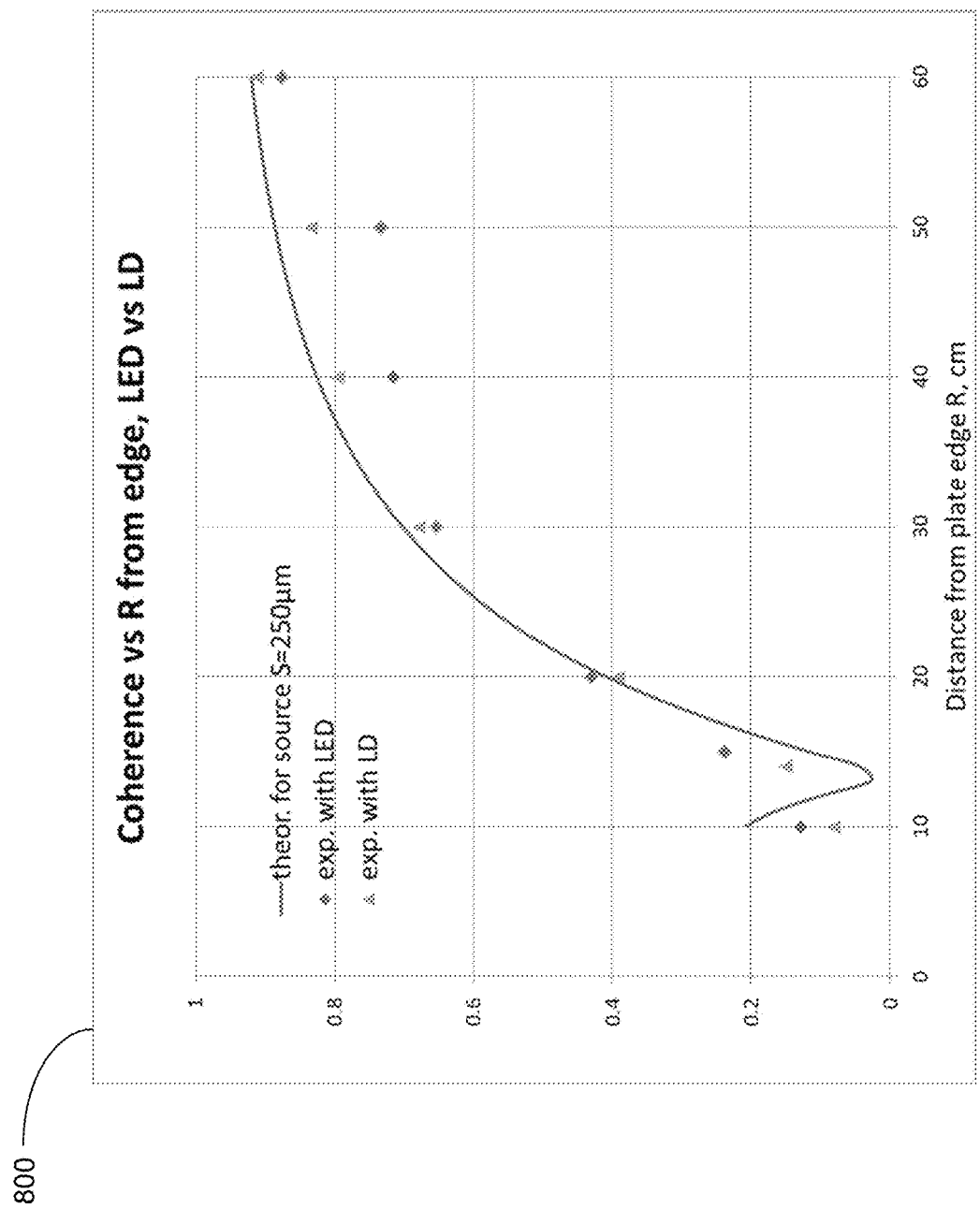
FIG. 8 illustrates a graph comparing the spatial coherence of fluorescent light generated by using a LD and an LED according to one or more aspects of the disclosed subject matter.

More specifically, when comparing the spatial coherence of fluorescent light generated by using a LD and an LED to pump phosphor plate (e.g., a graph comparing coherence versus distance from plate edge for a LD and an LED), the results illustrated in FIG. 8 show that the spatial coherence of fluorescent light from the phosphor plate pumped by LD and LED are about the same. Unlike the light from the single mode laser, the spatial distribution of the light emitted from the LD and LED are not circularly symmetrical and are typically unevenly distributed in vertical and horizontal directions (e.g., Beam Divergence (FWHM) at two directions are 8 degrees and 14 degrees, respectively). Accordingly, it can be difficult to form finely shaped localized illuminations to illuminate on the phosphor plate.

Figure 9:
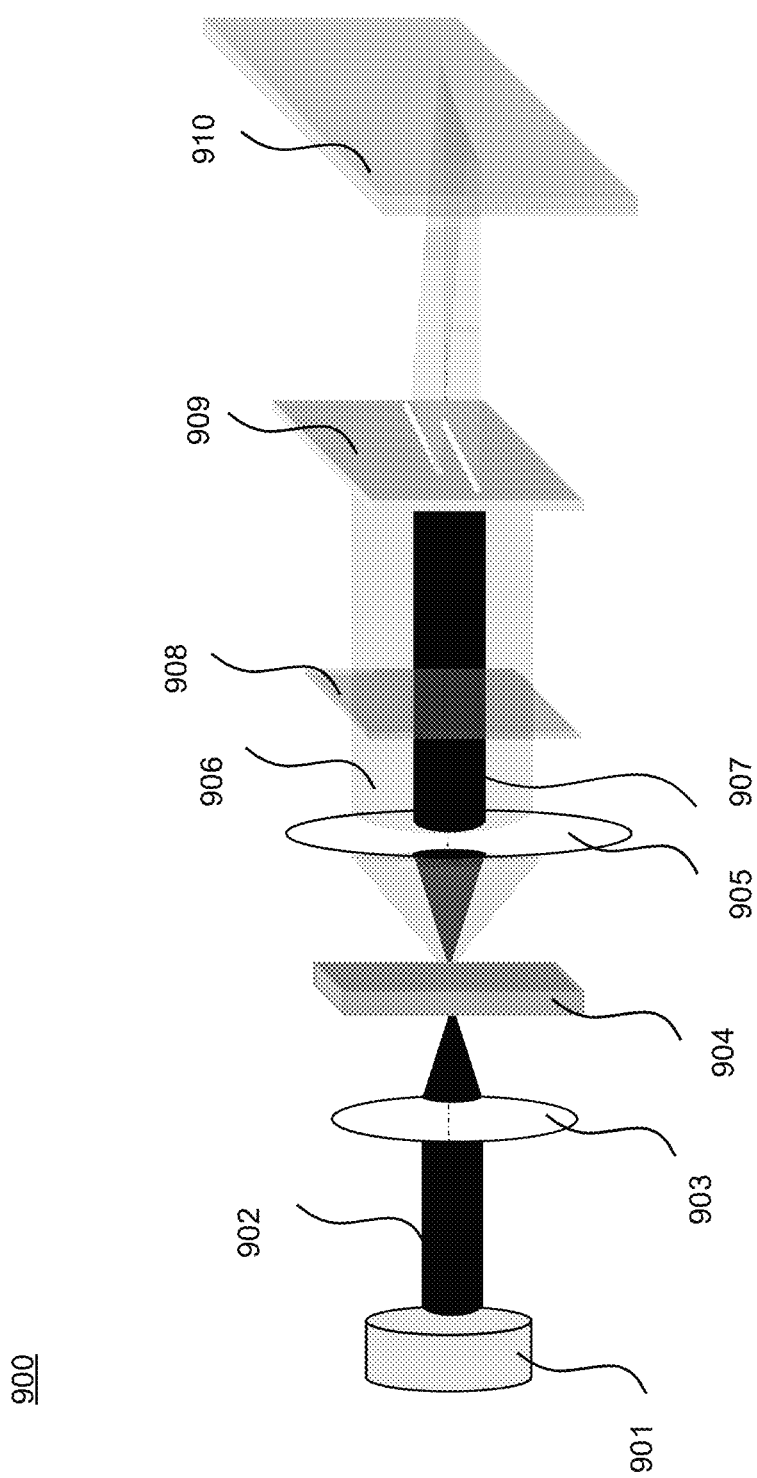
FIG. 9 illustrates an exemplary experimental set up according to one or more aspects of the disclosed subject matter.

To improve this, edge emission can be used to define the size of the emitter in the phosphor plate, in which the focusing ability of the pump light is not critical to define the size of the emitter. In edge emission configuration, the size of the emitter can be determined by the edge size of the phosphor plate or the thickness of the phosphor plate. Therefore, the spatial coherence on one dimension (along the thickness) can be investigated because light is only confined in this direction. Experiments conducted measured the visibility of the fringes and degree of the spatial coherence with pump light of blue LD (λ=444 nm) and LED (λ=455 nm). Source size is constrained by the thickness of the plate of 250 μm. Accordingly, when comparing the LD and LED, there is little to no difference in spatial coherence of converted yellow light for excitation by blue LD or LED. For example, as illustrated in FIG. 9, the experimental set up 900 can include a pump light source 901, which can be a blue laser, LD, or LED. Optics 903 can focus blue light 902 emitted from the pump light source on a phosphor plate 904. Next, the light can be incident on expansion and collimation optics 905 and fluorescent light 906 emitted from the phosphor plate and blue light residue 907 left after the phosphor plate can be incident on a spectral filter 908. After the spectral filter, the fluorescent light and blue light residue are incident on a double slit screen 909 and a detector 910 (e.g., camera) can detect the light passing through the double slit screen.

Phase Modulation of the Broad Band Light Selected from the Fluorescent:

The visibility measurements show that the fluorescent light is spatially coherent when the correct size of the emitter and the proper wave front is selected from the correct distance away from the emitter. Accordingly, the reasonable spatial coherence of the light beam should have the ability to be spatially modulated like the coherent source (e.g., laser).

Figure 10:
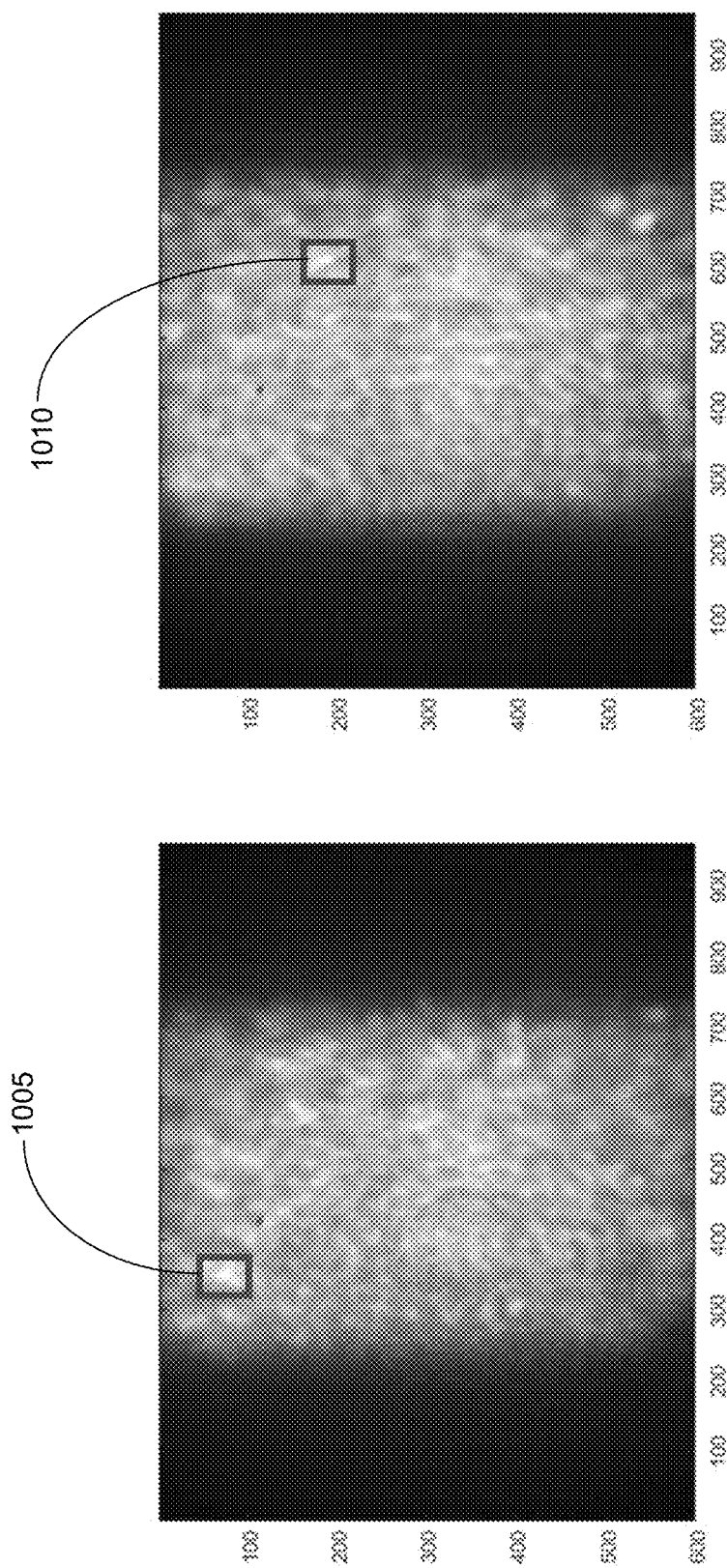
FIG. 10 illustrates a first exemplary phase modulation on the broadband light according to one or more aspects of the disclosed subject matter.
Figure 11:
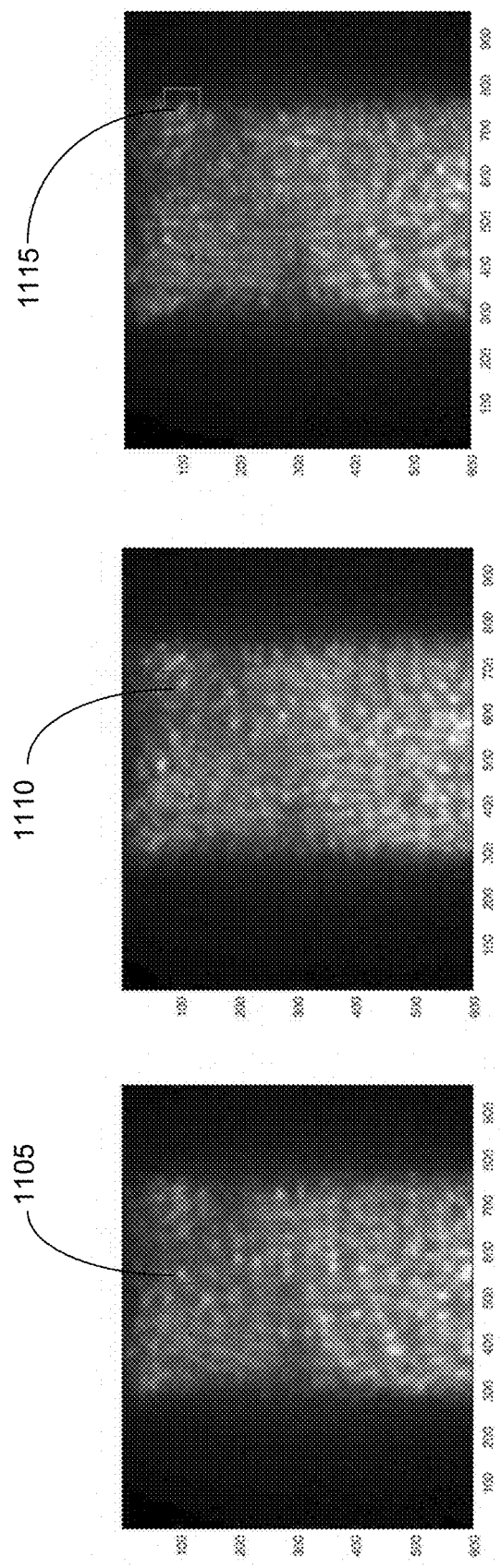
FIG. 11 illustrates a second exemplary phase modulation on the broadband light according to one or more aspects of the disclosed subject matter.
Figure 12:
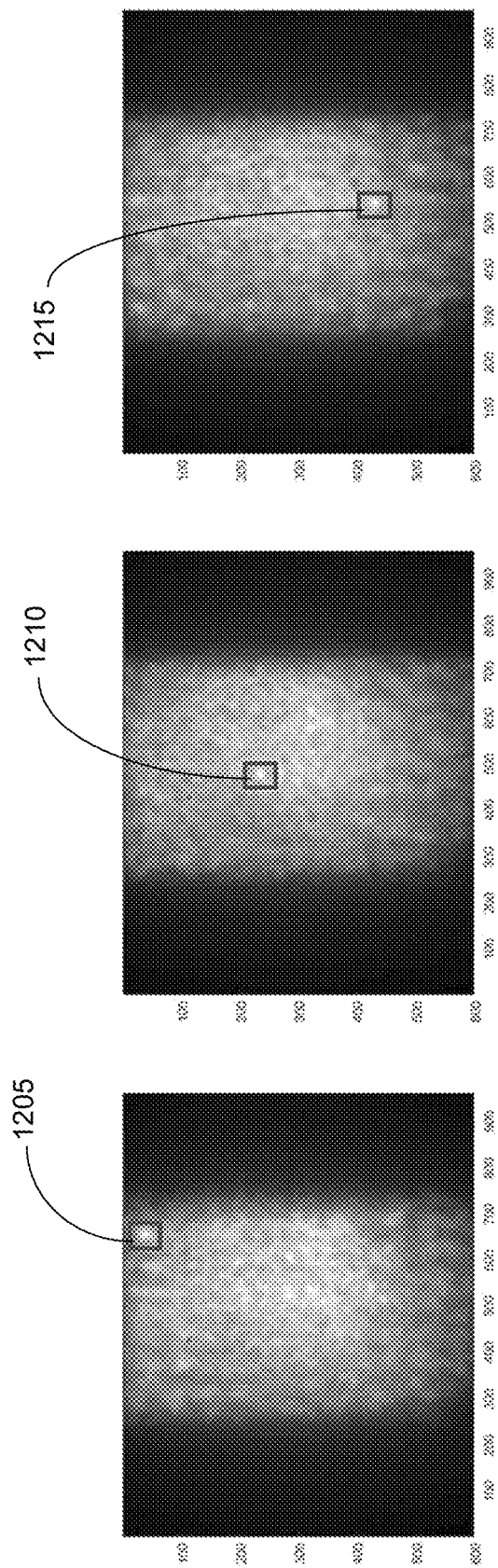
FIG. 12 illustrates a second exemplary phase modulation on the broadband light according to one or more aspects of the disclosed subject matter.

In one embodiment, the configuration shown in FIG. 2A can include a reflective modulator (e.g., digital micromirror device) as the modulator 110. Additionally, in an experiment, the reflected phase patterns from the modulator were imaged on a scattering medium made by mixing the Al2O3 particles in transparent polymer and solidified, for example. A camera was placed after the scattering medium. A series of modulated light by changing the displayed patterns on the modulator 110 were projected on the scattering medium while a CCD (e.g., detector 115) collected the corresponding images after the scattering medium. Equation (1) was solved to reveal the transmission matrix of the scattering medium, which describes the relationship between the input spatial patterns before the scattering medium and the resulted output after the scattering medium. Based on the transmission matrix of the scattering medium and the requested output, the optimized incident pattern can be evaluated for equation (2). In this case, localized illuminations on the camera were defined as the requested outputs, and the optimized patterns to generate the localized illuminations after the scattering medium were calculated and employed on the spatial light modulator. In the experiments, spatial filters were used to select the fluorescent light having a certain bandwidth to conduct the phase modulation on the broadband light. The localized illuminations formed by using the calculated optimized phase pattern applied on the modulator 110 using spectral filter were 620±10 nm (see FIG. 10), 550±10 nm (see FIG. 11), 520±10 nm (see FIG. 12), respectively. In other words, the localized illuminations can be formed on the detector after the scattering medium by spatially modulating the input optical field (or the optical phase). By evaluating the transmission matrix of the scattering medium, employing the optimized optical phases on the spatial light modulator, localized illuminations 1005, 1010, 1105, 1110, 1115, 1205, 1210, 1215 (i.e., points in the boxes shown in FIGS. 10-12) can be formed on any location on a detector (e.g., camera screen). In other words, the localized illuminations can be scanned at any position. Accordingly, fluorescent light generated by pumping the phosphor plate with blue laser (e.g., LD or LED), can be spatially modulated by their phases to generate the required output after the scattering medium.

Efficient Light Source with Controlled Spatial and Temporal Properties

In one embodiment, the light source itself can be configured to assist in imaging a target object through a scattering medium. Generally speaking, in terms of the way light is generated, a light source can include electrically discharged sources including an arc lamp, gas discharge lamp, fluorescent lamp, sodium-vapor lamp, plasma lamp, etc. Additionally, the light source can be based on incandescence, meaning that emission of light from a hot body as a result of its temperature, such as black-body radiation, halogen lamp, incandescent light bulb, etc. Another example includes luminescence, meaning that emission of light by a substrate not resulting from heat. Further, there is cathodoluminescence, which is light resulting from a luminescent material being struck by the electrons; chemiluminescence, which is light resulting from chemical reaction; electroluminescence, which is light resulting form of an electric current passed through a substrate, such as light emitting diodes, laser including chemical laser, laser diode, gas laser, solid state laser; photoluminescence, which is light resulting from absorption of photons, including fluorescence, which is the emission of light by a substrate that has absorbed light of other electromagnetic radiation; and phosphorescence, in which phosphorescent material does not immediately reemit the radiation it absorbs.

Considering all the different types of light sources, optical sources are employed for various applications regarding their general properties, which can include temporal and spatial characteristics like wavelength range, optical phase distribution, polarization, intensity, time duration (continued or pulsed), and the like. Coherence of the optical source includes temporal coherence and spatial coherence. As has been described herein, the temporal coherence corresponds to how monochromatic a source is, which measures an average correlation between the value of a wave and itself delayed by some time duration (e.g., coherence time). The coherence time is determined by the frequency bandwidth of the light, $\Delta t \sim 2\pi/\Delta\omega$, where $\Delta\omega$ is the angular frequency bandwidth. The length of the light travels during the coherence time is called coherence length. The spatial coherence is the cross-correlation between two points in a wave for all times, a concept of wave disturbance describing the correlation among the points at the wave fronts. In other words, the spatial coherence is a mutual interdependence or connection of variable wave quantities of two different points in a given instant of time.

The coherences of the light source show the temporal and spatial coherence of the light beam, which greatly affect the properties or behavior of the light including how far the light can travel, how the light interacts with the material it illuminates, to what degree the light can be modulated to perform unique functionalities, and the like, for example. The wavelength and optical phase distribution are features of the light sources that can determine their applied fields. Strict control of these properties of the light sources for certain applications can limit the availability of such sources. For example, free space optical communication requires no specific property as long as there is a clear sight between the source and the destination for the optical receiver to reliably decode the transmitted information. In an optical fiber or waveguide system, wavelength and/or optical phase can affect the performance of the designed functionalities. In other applications (e.g., holography, endoscopy, optical coherence tomography, etc.), the requirement for the optical phase controlling or modulation can impose restrictions for the light sources where the light sources can be limited by the availability of existing light sources. For example, laser sources are usually the only option for certain measurements or applications. Control or modification of the light sources required for such specific applications can be made because of the architectures of laser-based sources that allow temporal or spatial characteristic to be maintained.

Typically, the advantages of the small size, high power, and broad bandwidth of fluorescent light sources are used over laser based light sources for general lighting purposes (e.g., room lighting, decoration, headlamp, etc.). However, as further described herein, fluorescent light sources can be used to control optical properties including phase distribution in terms of spatial coherence, and the like. By controlling and/or modulating the spatial coherence from the fluorescent light, many applications for phosphor-based lighting sources can be employed where only laser light could be used previously. In other words, phosphor-based lighting sources can extend in the applications that traditionally only use lasers. For example, in one aspect, the phosphor-based light sources can be used in headlamp designs (e.g., vehicle headlamps/headlights) in which white light can be modulated in phase or amplitude to achieve better image quality through severe weather conditions including rain, snow, fog, heavy pollutions, and the like. Additionally, spatial coherence control can improve image quality in endoscopy applications instead of relying on a small spherical or aspherical lens to make a small localized illumination required for good image quality.

FIG. 4A illustrates an exemplary light source 400 according to one or more aspects of the disclosed subject matter. Generally speaking, the light source 400 can be a phosphor-based fluorescent light source configured to fully control the spatial coherence or optical phase distribution and spectral response of the phosphor-based fluorescent light source by spatial pumping the phosphor plate, specifically designing the geometrical configuration, and modulating the spectral response of emission to acquire specifically controlled optical properties including spatial coherence and spectral distribution for many specific applications in terms of phase or amplitude modulation, operation cost, ease of operation, and safety.

For example, a YAG:Ce ($Y_3Al_5O_{12}$:$Ce^{3+}$) phosphor plate can be used as the fluorescent light source, using a solid laser 457 nm, gas laser, Ar laser, LD (laser diode), or LED (light emitting diode) to pump the phosphor plate. Additionally, the configuration for white light generation can include blue pump light being focused onto the phosphor plate, and the fluorescent light can be collected and investigated in both parallel and perpendicular directions relative to the propagation direction of the pump light. As further described herein, the spatial coherence of the fluorescent light from YAG:Ce phosphor plate can be controlled, and the fluorescent light generated by an LD and an LED to pump the phosphor plate exhibited the same spatial coherence. Accordingly, the spatial and temporal properties of an efficient light source (e.g., light source 400) can be controlled. It should be appreciated that the light source 400 can be the light source 105 in the system 100.

Generally, the phosphor cylinder is core in waveguide structure while the cladding around the phosphor core cylinder has a higher refractive index to confine the light inside the phosphor cylinder. The pump light illuminates the grating and changes the propagation direction into the waveguide. The pump light enters (coupled) into the phosphor cylinder waveguide and excites the phosphor molecules to emit broad band light having a longer wavelength than that of the pump light. More specifically, the configuration of the light source 400 includes pumping light (e.g., pump light 425) having a wavelength within a blue range from a laser, laser diodes, or light emitting diodes focused onto the phosphor cylinder by the reflector 435. Most of the pump light is coupled (i.e., coupled light 430) into waveguide 415 by the grating coupler 420. The coupled or converted pump light enters the phosphor cylinder waveguide 405 exciting the phosphor molecules into a higher level (i.e., excited level), which relaxes to a lower level or original base level to emit broad band fluorescent light 440 with longer wavelength than that of the pump light. The fluorescent light 440 is confined by the size of the phosphor cylinder 405 and the cladding layer 410. The fluorescent light 440 is collimated by the collimating lens 450 after exiting the phosphor cylinder 405, and is reflected back and forth (e.g., fluorescent light traveling back and forth in a reflection chamber 475 represented by dashed arrows 465) by the reflectors (e.g., front reflector 455 and rear reflector 460) before being emitted out as radiation 445 at the emission aperture 470 on the reflector 455.

Figure 4C:
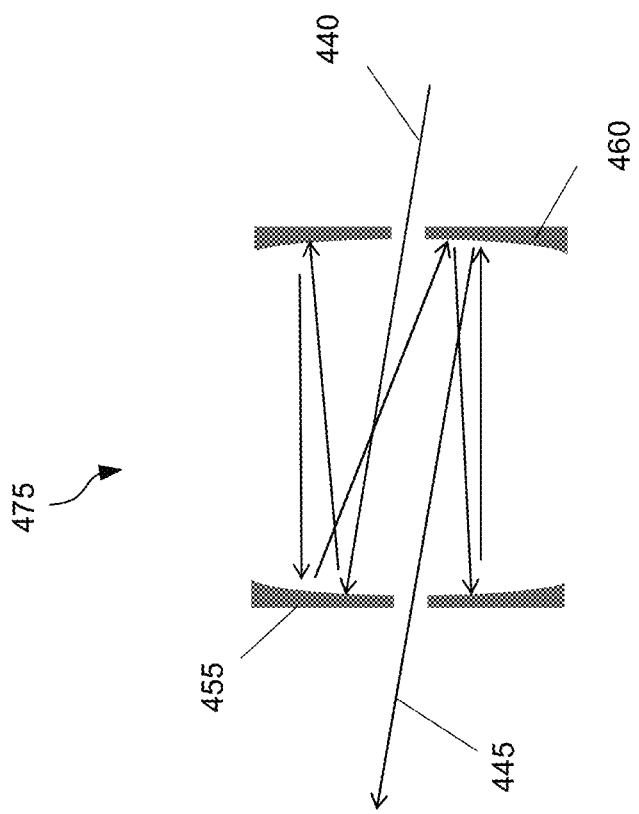
FIG. 4C illustrates an exemplary spherical reflection chamber according to one or more aspects of the disclosed subject matter.
Figure 4B:
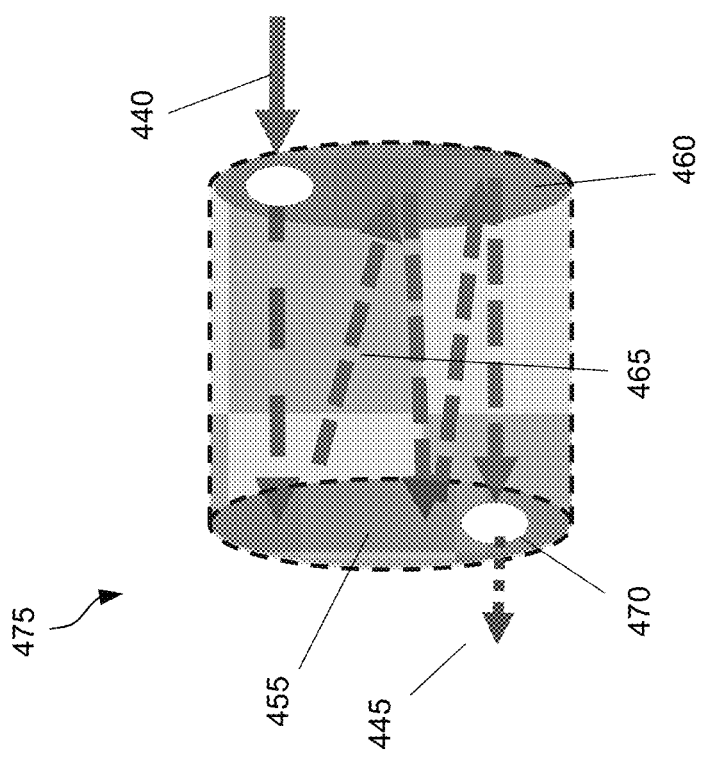
FIG. 4B illustrates an exemplary reflection chamber according to one or more aspects of the disclosed subject matter.

FIGS. 4B and 4C illustrate exemplary reflection chambers (e.g., reflection chamber 475) according to one or more aspects of the disclosed subject matter. Because of the nature of the fluorescent emission, the light emitted by the phosphor plate comes from the many fluorescent molecules, or emitters, which are not correlated by the processing of the stimulation emission in the lasering mode. Therefore, a size of the emitter area and the distance from the emitters can determine the spatial coherence of the wave front. That is the reason why light passing though the pinhole has a certain spatial coherence corresponding to the distance. Intuitively, light beams emitted from each of the emitter molecules at the pinhole that reach the plane far away from the pinhole show little difference. Therefore, certain degrees of spatial coherence appear. In order to achieve the required spatial coherence within a certain area based on the size of the phosphor waveguide core, the optical path can be set to a certain length at which the spatial coherence at the exit of the reflector chamber reaches a desired value by designing the reflector as shown in FIG. 4B or FIG. 4C, for example. In other words, the spatial coherence can be improved by increasing the total optical path length that travels through a small, constant sample volume.

FIG. 4B illustrates an exemplary reflection chamber according to one or more aspects of the disclosed subject matter. For example, front reflectors 455 and rear reflector 460 can be specifically designed. In other words, the reflectors 455, 460 can be designed precisely to achieve the required number of reflections (465) before exiting the reflection chamber 475 as exited light 445 radiated out of an emission aperture 470. Additionally, the design of multipass reflection cells can be modified to extending the optical path as shown in FIG. 4C.

FIG. 4C illustrates an exemplary spherical reflection chamber according to one or more aspects of the disclosed subject matter. In one aspect, the reflection chamber 475 can be a spherical reflection chamber where spherical mirrors 455, 460 are arranged to achieve multiple reflections. In other words, reflectors 455, 460 can be spherical mirrors configured to confine the incident light 440 in the reflection chamber 475. The spherical mirrors are used to redirect the beam at each reflection point resulting in the beam being restricted to a predefined space along a controlled path until it exits (445) the optical chamber.

Additionally, it should be appreciated that the reflectors can be disposed in different positions and/or they can be different types of reflectors (e.g., shapes) to achieve different illumination approaches. For example, the reflectors can be double parabolic reflectors where two parabolic reflector surfaces can concentrate the pump light on the phosphor cylinder. Pump light can enter the inner surfaces of the parabolic surfaces from edges of the reflectors. Part of the pump light reflected from the surface directly illuminates the phosphor cylinder, part of the reflected pump light can be reflected by the surface of the other reflector towards the phosphor cylinder, and part of the reflected pump light can be reflected by the inner surface of the second reflector and then reflected by the first reflector before reaching the phosphor cylinder. Alternatively, the reflection portion can be a cylindrical reflector. For example, pump light enters the cylindrical reflector directly illuminating on the phosphor cylinder. Most of the pump light illuminating the phosphor cylinder waveguide can be coupled into the waveguide by the grating coupler. Part of the pump light is reflected by the phosphor cylinder and then reflected by the inner surface of the cylindrical reflector and re-illuminated onto the cylinder. Further, in one aspect, the reflection portion can be a single parabolic reflector. For example, the parabolic reflector reflects the pump light at the inner surface and redirects the pump light to the phosphor cylinder.

Regarding the grating coupler, the grating coupler is used to convert the pump light from a free space mode to a guided mode. The basic grating coupler is a periodic structure with its periodicity of $$\Lambda = \frac{\lambda}{n_{eff}},$$

where $\lambda$ and $n_{eff}$ are me wavelength of the pump light and the effective refractive index of the waveguide. This waveguide is configured to convert the pump light into a vertical direction and enter a phosphor cylindrical waveguide. To increase the coupling efficiency, an overlayer with certain refractive index can be applied on the grating. The grating coupler can be a periodic structure or quasiperiodic structures for high efficiently coupling of pump light onto the phosphor cylinder. The incident angle of pump light toward the grating coupler could be slightly detuned from the normal direction of the grating surface to avoid high order reflection from the grating.

Figure 4D:
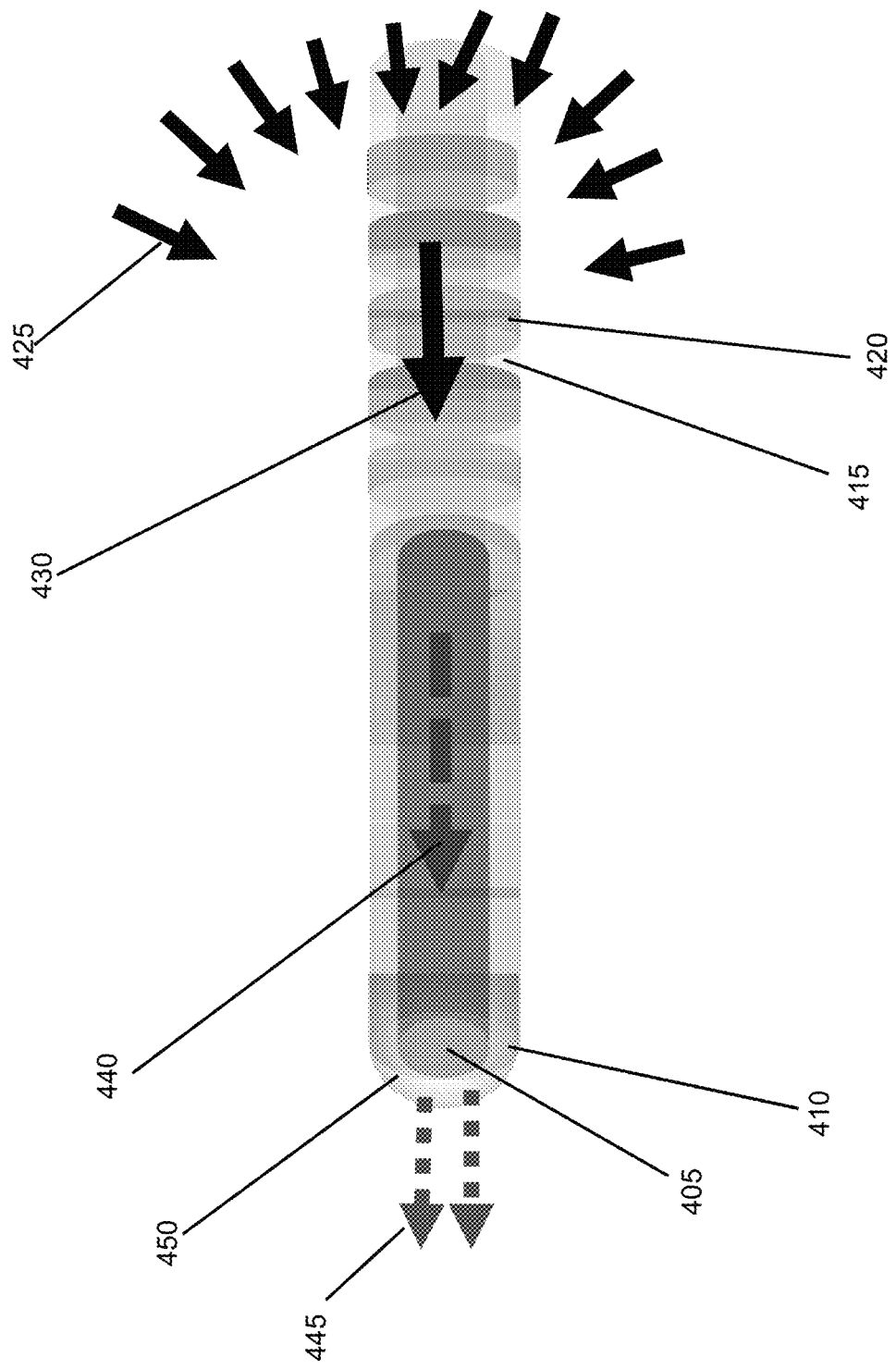
FIG. 4D illustrates an exemplary configuration of a pump light coupled into a waveguide according to one or more aspects of the disclosed subject matter.

FIG. 4D illustrates an exemplary configuration of a pump light coupled into a waveguide according to one or more aspects of the disclosed subject matter. For example, pump light 425 focused on the grating coupler 420, diffracted by the grating, changes the propagation direction from perpendicular to the axis of the waveguide 415 to parallel to the axis of the waveguide 415 and propagates into the waveguide (e.g., coupled light 430 corresponding to pump light coupled into the waveguide). The coupled light 430 propagates in the waveguide 415 and is end-coupled into phosphor waveguide 405, in which much of the pump light is converted into the fluorescent light 440. The fluorescent light 440 can propagate in the phosphor waveguide 405 and is confined by the cladding layer 410, and the fluorescent light is emitted (i.e., emitted light 445) out of the phosphor waveguide 405. Alternatively, the configuration of FIG. 4D can be modified to include narrow band irradiation selection as illustrated in FIG. 4E.

Figure 4E:
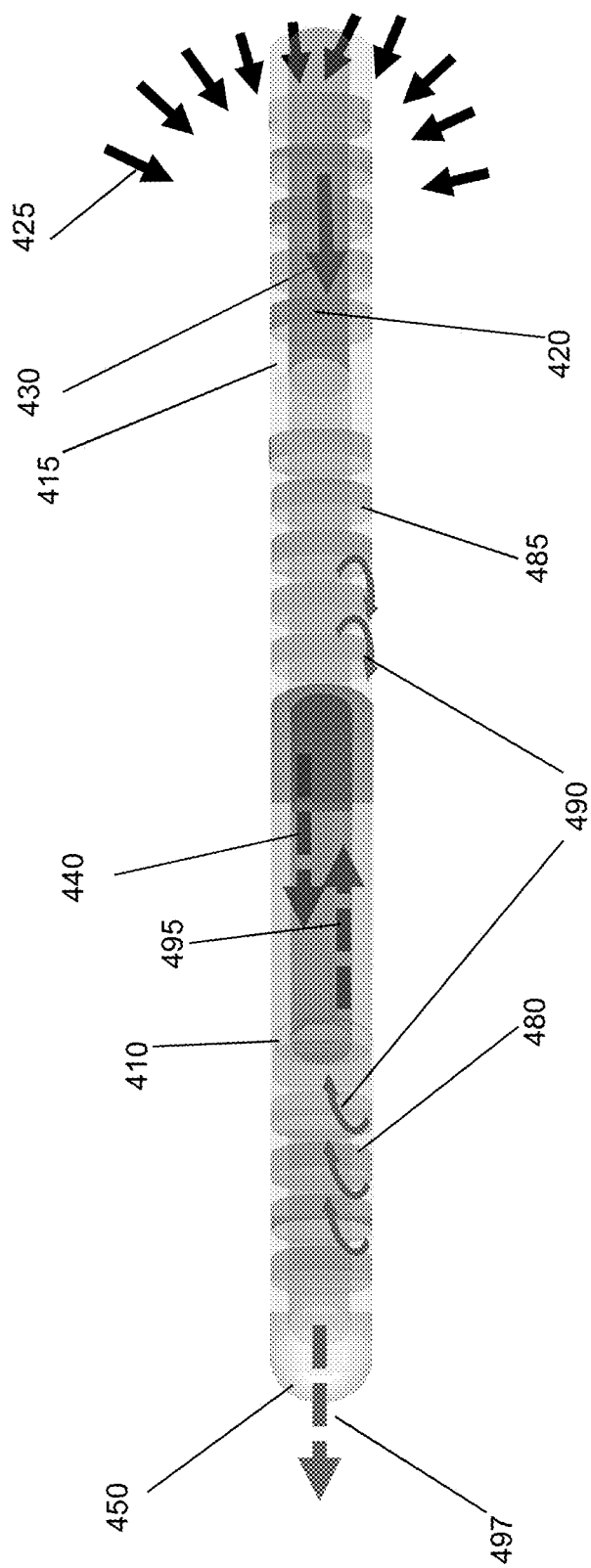
FIG. 4E illustrates a narrow band irradiation selection configuration according to one or more aspects of the disclosed subject matter.

FIG. 4E illustrates a narrow band irradiation selection configuration according to one or more aspects of the disclosed subject matter. For example, the fluorescent light generated from the phosphor is broadband with bandwidth defined as the wavelength width at which the intensities of the optical powers fall to half of the maximum power. The bandwidth is usually broader than 50 nanometers (the bandwidth of YAG:Ce, for example, $Y_3Al_5O_{12}:Ce^{3+}$, where phosphor molecules emit fluorescent light with bandwidth of around 100 nanometers from 520-620 nanometers). The spectral bandwidth of the fluorescent light can be changed by a spectral filter applied to the end of the output. However, by using an inside resonator, the emitting wavelength range with narrow bandwidth can be selected down to 1 nanometer. In one example, the inside resonators can be Bragg mirrors made of layers of high and low refractive indices with a thickness of ¼ selected central wavelength. Referring to FIG. 4E, the configuration can include the pump light 425 (e.g., the pump light 425 can be reflected by the reflector 435 as shown in FIG. 4A) focuses on the grating coupler 420, and changes the propagation direction becoming the pump light (e.g., coupled light 430) propagating in the waveguide 415. The pump light propagates and is end-coupled into the phosphor cylinder waveguide 410 and excites fluorescent light 440, which propagates forward and is selectively reflected by the Brag mirror front reflectors 480. The Brag mirror front reflectors 480 reflect the specific wavelength with a certain wavelength bandwidth at each of the mirrors (490). The reflected fluorescent light 495 propagates back and is reflected at Brag mirror rear reflectors 485, further selecting the wavelength range. The reflections go back and forth until the final spectral requirement is met at the output fluorescent light 497.

Additionally, it should be appreciated that other configurations corresponding to the phosphor waveguide and coupler can be contemplated. For example, the phosphor waveguide can include a phosphor cylinder core to emit fluorescent light and cladding to confine the fluorescent light inside the phosphor core. The connection between the coupler waveguide and the phosphor waveguide can be a dielectric coupler waveguide core and couple waveguide cladding with refractive indices matching the phosphor waveguide core to reduce the insertion loss. Also, the dielectric couple waveguide can be just the core. Alternatively, the coupling of pump light to the phosphor waveguide can also use taped waveguide configuration.

Further, it should be appreciated that the shape and excitation size or excitation volume of the phosphor cylindrical waveguide can be varied to match the required intensity of fluorescent light as well as other considerations like heat dissipation, for example. The phosphor cylindrical waveguide can be designed to gradually change the diameter of the core and cladding to confine the optical field of the fluorescent light emitting out of the phosphor. Accordingly, as described herein, the configurations are designed to control the spatial coherence of the fluorescent light generated from the phosphor by confining the fluorescent light into a certain area while managing the optical path length before the fluorescent light exits the device. Further, when varying the shape and exciting size or excitation volume of the phosphor cylindrical waveguide, the light conversion efficiency can also be taken into account by reflectors, grating coupler, and the like to make the device energy efficient and cost effective in terms of phosphor material.

Regarding the phosphor waveguide, the phosphor waveguide includes a phosphor cylinder as a waveguide core and a cladding surrounding the phosphor cylinder. The cladding has a lower refractive index than that of the core to define the light inside the core. Regarding the coupler waveguide, the coupler waveguide is designed to couple pump light into the phosphor cylinder waveguide. The coupler waveguide can have a waveguide structure with grating, for example, in which the waveguide core has a similar refractive index as the phosphor cylinder to avoid reflection (loss) of the pump light.

The diameter of the phosphor cylinder depends on the application and the index of its cladding. In one aspect, the diameter of the phosphor cylinder can be defined by the required coherence of the fluorescent light emitted out of the phosphor cylinder. The smaller the size of the phosphor cylinder, the shorter the distance required from the emitted plane to get the required spatial coherence at certain distance away from the emitters. Additionally, the area which emits the fluorescent light depends on the size of the focused pump light. Due to the thickness of the phosphor plate and the cone configuration of the focused pump beam, the illuminated phosphor area, which emits fluorescent light, is not determined by the localized illumination, but rather by the average area of the incident cone structure into the phosphor and the cone out of the phosphor plate.

The emitting size of the fluorescent light is determined only by the actual size of the phosphor cylinder at the output (compared to some configurations that depend on more than one parameter). The actual phosphor shape or size can be changed to match the excited phosphor volume in terms of controlling the emitting spectral range in terms of the portion of the pump light (usually blue light) to guarantee generation of white light at the output as well as control of the emitted power. For example, the phosphor cylinder of the phosphor waveguide can be cone shaped, which can allow the balancing of the white light requirement in terms of the portion of the pump light and the generated fluorescent light.

Regarding spectral control of the light, the spectral distribution of the output light from the emitting edge of the light source can be adjusted regarding to the applications. For white light, in order to match human color perception for applications in a variety of industries, the colorimetry is used to quantify the response of the human visual system. The chromaticity coordinates of the three primaries are plotted in a chromaticity diagram, or Correlated Color Temperature (CCT) can be used to evaluate the acceptance of the generated light source. The portions of blue light from the pump light and yellow fluorescent light from the phosphor can be realized in two ways. One is the blue light is the residue of the pump light. In this configuration, the key to acquire the acceptable white light is to adjust the thickness or width of the phosphor cylinder and the intensity of the pump light to adjust the portion of the blue residue after it is absorbed by the phosphor and converted to yellow, while enough blue light is left unconverted and mixed with the yellow to form the required white light. The other configuration to form the white light is to use blue light directly from the pump light to mix with the fluorescent light from the phosphor. In this configuration, the blue residue in the output of the pumped phosphor cylinder is not used to match the required portion for blue light, but just used to calculate how much of the extra blue light is needed to add to compensate. In this configuration, phosphor thickness and pump light are decoupled in terms of the evaluation of the white light. They are only used to calculate the power for the fluorescent light and other necessary measures.

Regarding the narrow band spectral source, the temporal coherence of the fluorescent light can also be modified by adjusting the wavelength (or frequency) bandwidth with added resonators (e.g., FIG. 4E). The bandwidth of the fluorescent light can be tuned by designing the resonator with different bandwidth selection while changing the material (refractive indices), thickness, and the number of layers, as well as the length of the phosphor wave guides, for example.

Regarding the spatial coherence control of the light, the fluorescent light usually does not have spatial coherence except passing through a small aperture, after which the spatial coherence of the fluorescent light would depend on the size of the aperture and the distance away from the aperture. In general, unlike the laser, the phosphor molecules emit the fluorescent light to 4 pi radians. When an aperture is used to acquire the spatial coherence, the output power of the light source is extremely limited, which can make the light source useless in many applications. However, as has been described herein, guided pumping and radiation makes the fluorescent light controllable in terms of the power and spatial and temporal coherence. In other words, the fluorescent light is partially of the properties of the laser source, but more powerful and flexible in terms of spectral range, which would find applications in many fields (e.g., imaging objects in and through a scattering medium).

Coherence Control in Light Scattering Process

Generally speaking, because the scattering medium (e.g., fog) is composed of randomly arranged non-uniform building blocks with sizes in the range of the wavelength, the field (phase and amplitude) distributions (i.e., wave front) reflected off the target object can be completely destroyed at the image plane when the light passes through the scattering medium. However, if there is the opportunity to compensate for the distorted portion of the optical phase or amplitude distribution before or after the scattering processing, then an image of the target object can be retrieved. The compensation can depend on the capability of acquiring the field distribution after the scattering medium and the approach to employ the compensation.

For example, the field distribution after the scattering medium can be measured. Here, a coherent light source can be used for the illumination in order to acquire the exact distribution of the optical phase because interference can be employed to acquire the optical phase information where a traditional optical intensity detector can be used to evaluate the optical phase of the illumination in which a reference beam with known optical phase is introduced. Accordingly, the coherent light source can be used for the scattering control. In one aspect, a laser source with a predetermined threshold of spatial coherence can be used. The spatial coherence is used for controlling the scattered light in and/or through the scattering medium in which the output field distribution (i.e., output channels) result from the interference of all the point sources (i.e., input channels). If a laser source is used, there is not only spatial coherence across the modulator, but there can also be temporal coherence, which ensures the coherence is maintained at the positions on the output plane where the optical paths can be different.

However, when a laser diode (LD) or light emitting device (LED) is used alone as the illumination source, its spatial and temporal coherence can affect the scattering control. For example, the spatial coherence may not be guaranteed across the entire modulator surface (e.g., the degree of the spatial coherence and the region (size) of the spatial coherence), and the temporal coherence can also affect the scattering control.

Alternatively, in one embodiment, a high degree of spatial coherence in scattering control can be avoided by implementing spatially localized coherence for scattering control rather for attempting to achieve global spatial coherence. For example, the light passing through scattering medium can be locally affected rather than globally across the entire modulator surface. The intensity of the localized illuminations after the scattering medium locally should depend on the main beams and their neighboring interferences around the main beams. In other words, the intensity of the localized illuminations after the scattering medium can be determined by the radiations from every light source point on the modulator (or scattering medium) and the interference contribution from the neighboring points around, as further described herein.

Figure 5A:
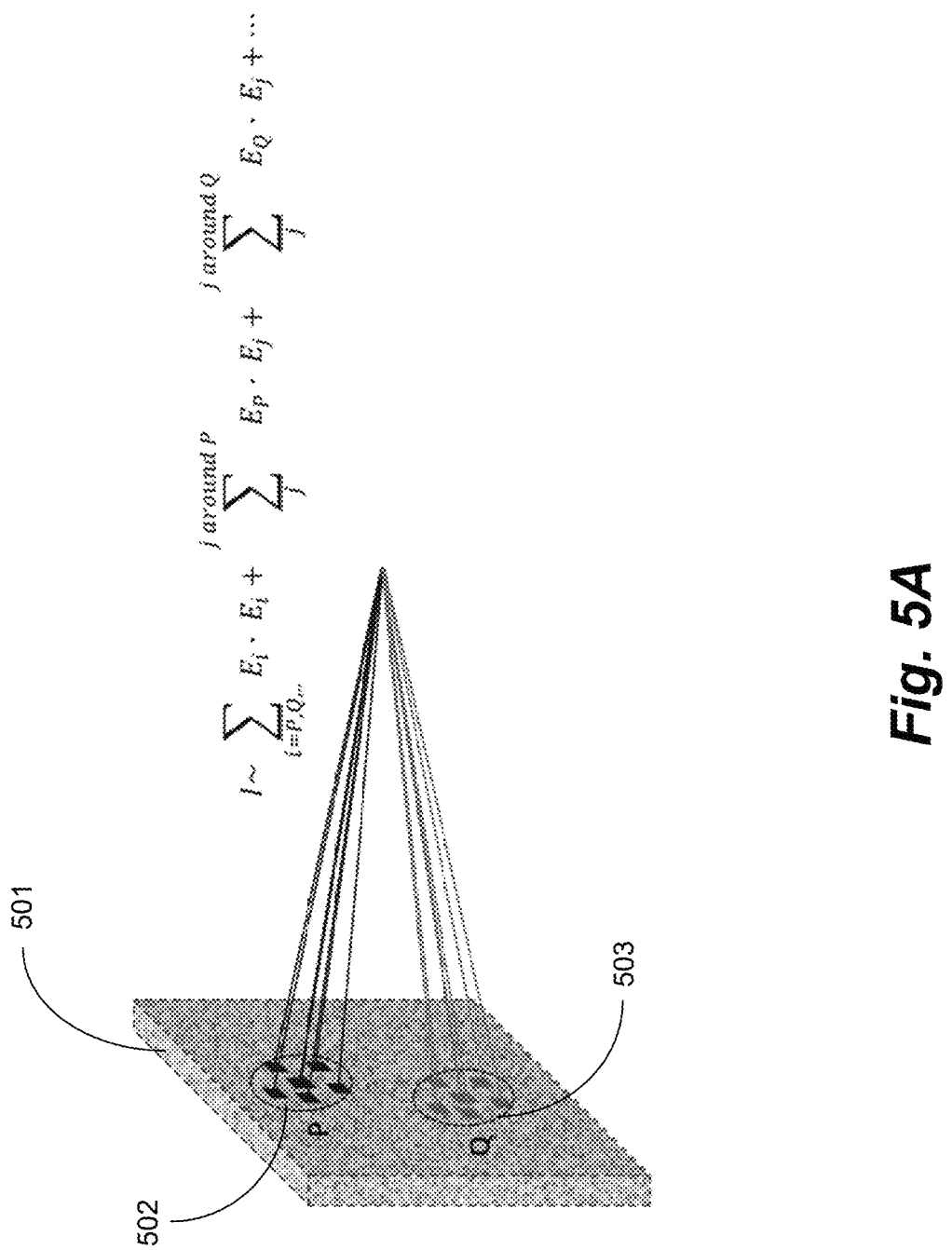
FIG. 5A illustrates local contributions of light sources according to one or more aspects of the disclosed subject matter.

Laser Diode Array as the Light Source:

FIG. 5A illustrates local contributions of light sources according to one or more aspects of the disclosed subject matter. The local contributions can be described by the following equations:

$$E = \Sigma_i E_i \qquad \text{Equation 5}$$

$$I = (\Sigma_i E_i)^2 \qquad \text{Equation 6}$$

$$I = \Sigma_i E_i \cdot E_i + \Sigma_{i,j}{}^{i \neq j} E_i \cdot E_j \qquad \text{Equation 7}$$

$$I = \Sigma_i E_i \cdot E_i + \Sigma_{i,j}{}^{j\ close\ to\ i} E_i \cdot E_j + \Sigma_{i,j}{}^{j\ far\ away\ from\ i} E_i \cdot E_j \qquad \text{Equation 8}$$

$$I \sim \Sigma_i E_i \cdot E_i + \Sigma_{i,j}{}^{j\ close\ to\ i} E_i \cdot E_j \qquad \text{Equation 9}$$

$$I \sim \Sigma_{i = P, Q, \ldots} E_i \cdot E_i + \Sigma_j{}^{around\ P} E_P \cdot E_j + \Sigma_j{}^{around\ Q} E_Q \cdot E_j + \ldots \qquad \text{Equation 10}$$

In equation 5, the field on the image can be the summation of field values from all the point sources on a modulator 501 (or scattering medium) at the target point. The intensity is the squared value of the field shown in equation 6, which could be rewritten as equation 7. Accordingly, the intensity at the certain position on the image is the summation of the intensity of all the point sources at the image position plus the interference of the fields from every two point sources on the modulator 501 (scattering medium). The interference contributions from every two point sources can also be divided into two groups. One group includes the interference contribution from the point sources near the main point sources, which can be defined randomly. The other group includes the interference contribution from the point sources far away from the main point sources, shown in equation 8. Further, since the contribution of the second group can be weak, it can be ignored as shown in equation 9. For example, in FIG. 5A, the intensity of the point on the image can be divided into the intensity of the point sources (P, Q, etc.) at the point and the interference contributions around the point source around P, or Q, respectively. In other words, the interference between the point sources from point source in P area 502 and the point source in Q area 503 are weak and can be ignored. It should be appreciated that more point sources can be used, but two are illustrated in FIG. 5A as an example.

Figure 5B:
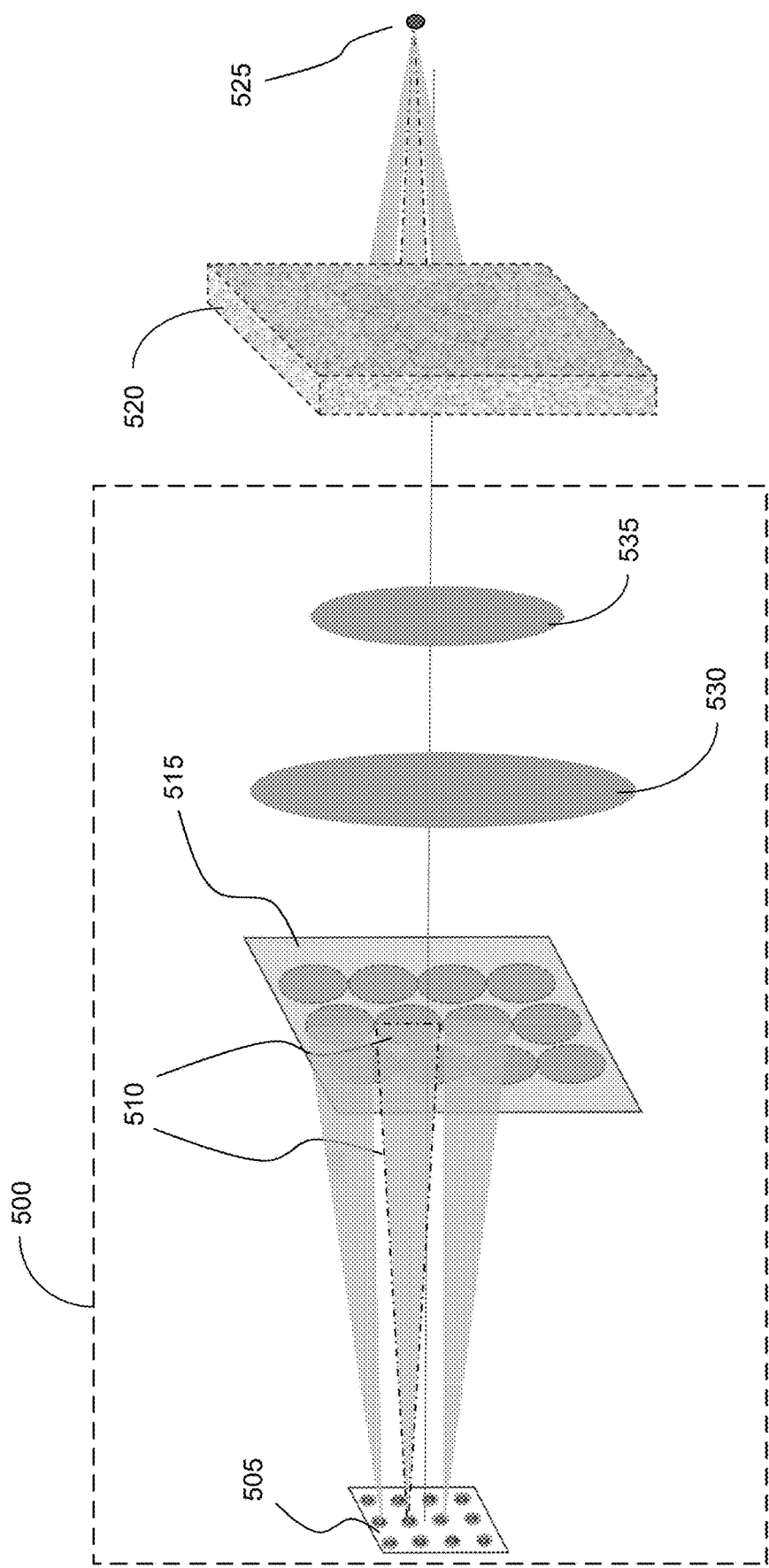
FIG. 5B illustrates an exemplary adaptive illumination system according to one or more aspects of the disclosed subject matter.
Figure 5C:
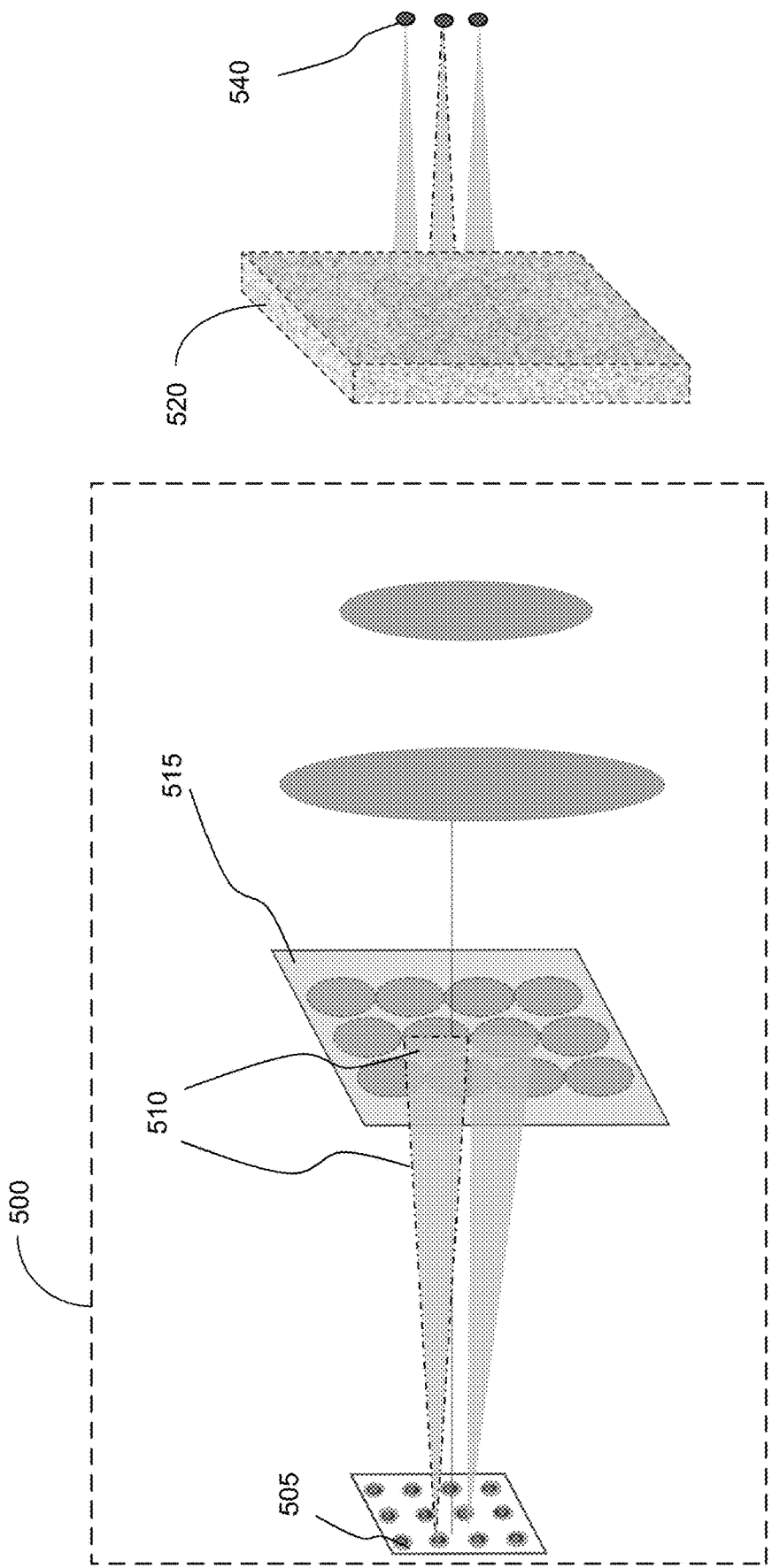
FIG. 5C illustrates the system having a laser diode array as the light source according to one or more aspects of the disclosed subject matter.

FIGS. 5B and 5C illustrate an exemplary adaptive illumination system 500 having a laser diode array as the light source. Using a laser diode array can provide various advantages as further described herein. Typically, to control the light through the scattering processing, the optical source should be of high spatial coherence. In other words, the light source should have a high spatial coherence to be able to perform imaging through a scattering medium (e.g., fog, rain, snow, pollution, etc.). When a laser source is used, its spatial coherence is completely across the wave front. Additionally, to have a high incident power into a scattering medium, a laser diode (LD) or light emitting device (LED), especially a multimode laser diode, is typically employed. However, the spatial coherence of the LD cannot be guaranteed to have enough spatial coherence across the surface of a modulator. When a white light source is used, the required spatial coherence is even more difficult to be reached. Therefore, a pinhole set on the light source, or pointed source, is traditionally used as the emitting source, and a long distance is required for the light to travel to reach the spatial coherence. However, by using a laser diode array as the light source, an adaptive illumination system can be configured to easily acquire the laser diode array as the light source to have a significantly higher illumination power on the scattering medium compared to one laser diode or LED. Additionally, by using a laser diode array as the light source, the required spatial coherence for the modulation of the scattered light is more easily acquired.

FIG. 5B illustrates an exemplary adaptive illumination system 500 according to one or more aspects of the disclosed subject matter. In one aspect, the system 500 can be an implementation of the system 100 in FIG. 1, for example, such that the system 500 can replace and/or be combined with one or more components in the system 100. The system 500 can include a light source 505, optical beams 510 from the light source incident on a modulator 515 (e.g., a spatial light modulator), and optics (e.g., a first imaging lens 530 and a second imaging lens 535). After the light passes through the imaging lenses 530, 535, the light is incident on a scattering medium 520 (e.g., fog, rain, snow, pollution, etc.) and the light forms a localized illumination 525. In one example, the localized illumination 525 can be used for imaging a target object in and/or through a scattering medium.

More specifically, the light source 505 of the system 500 can be a laser diode array. The laser diode array can be an array of discrete laser diodes or a Vertical Cavity Surface Emitting LASER (VCSEL) type of laser array which can have many laser cavities in one device. In one aspect, an array of the laser diodes can be bundled to illuminate the modulator 515, where each LD can illuminate a certain area of the modulator 515. In other words, by using a laser diode array the modulator 515 can be divided into a plurality of subareas or regions (corresponding to the number of laser diodes in the array). Each subarea is illuminated by an optical beam 510 corresponding to a laser diode from the laser diode array so that each laser diode in the laser diode array and the corresponding subarea of the modulator are one to one aligned. Therefore, each subarea of the modulator 515 corresponding to each laser diode in the laser diode array can be a sub-modulator to modulate the light passing through the scattering medium, for example, forming the localized illumination (or plurality of localized illuminations as illustrated in FIG. 5C) through the scattering medium 520. In other words, the spatial coherence of each LD in the array can be extended only to cover a small area of the modulator 515 rather than the entire area across the modulator. Therefore, the light from a LD covers the certain small area of the modulators which modulate the light in this area on the modulator. Accordingly, the light from the LD array is modulated individually by the certain small areas of modulator. This means that light from each LD forms a localized illumination at the same position on the image by the interference among the small area, and the intensity of the localized illumination is the summation of the light generated from each LD. As a result, the local spatial coherence can be advantageous compared to global spatial coherence because no spatial coherence is required among the laser diodes in the laser diode array. Accordingly, by using a laser diode array as the light source 505, the system 500 can have a higher illumination power on the scattering medium, and the required spatial coherence for the modulation of the scattering light is more easily acquired compared to one laser diode as the light source.

Further, in scattering control, a lens array can be added after the LD array to reshape the beam shape and size from each LD in the LD array 505, which can determine the size and uniformity of the light illumination on the modulator 515 form each LD in the LD array 505.

FIG. 5C illustrates the system 500 having a laser diode array as the light source 505 according to one or more aspects of the disclosed subject matter. Similar to FIG. 5B, the system 500 can include a laser diode array as the light source 505 and a one to one alignment for each laser diode in the laser diode array and the corresponding subarea of the modulator 515. However, in one aspect, the modulator 515 can be configured to modulate the light from the light source 505 to generate a plurality of localized illuminations 540.

Figure 5D:
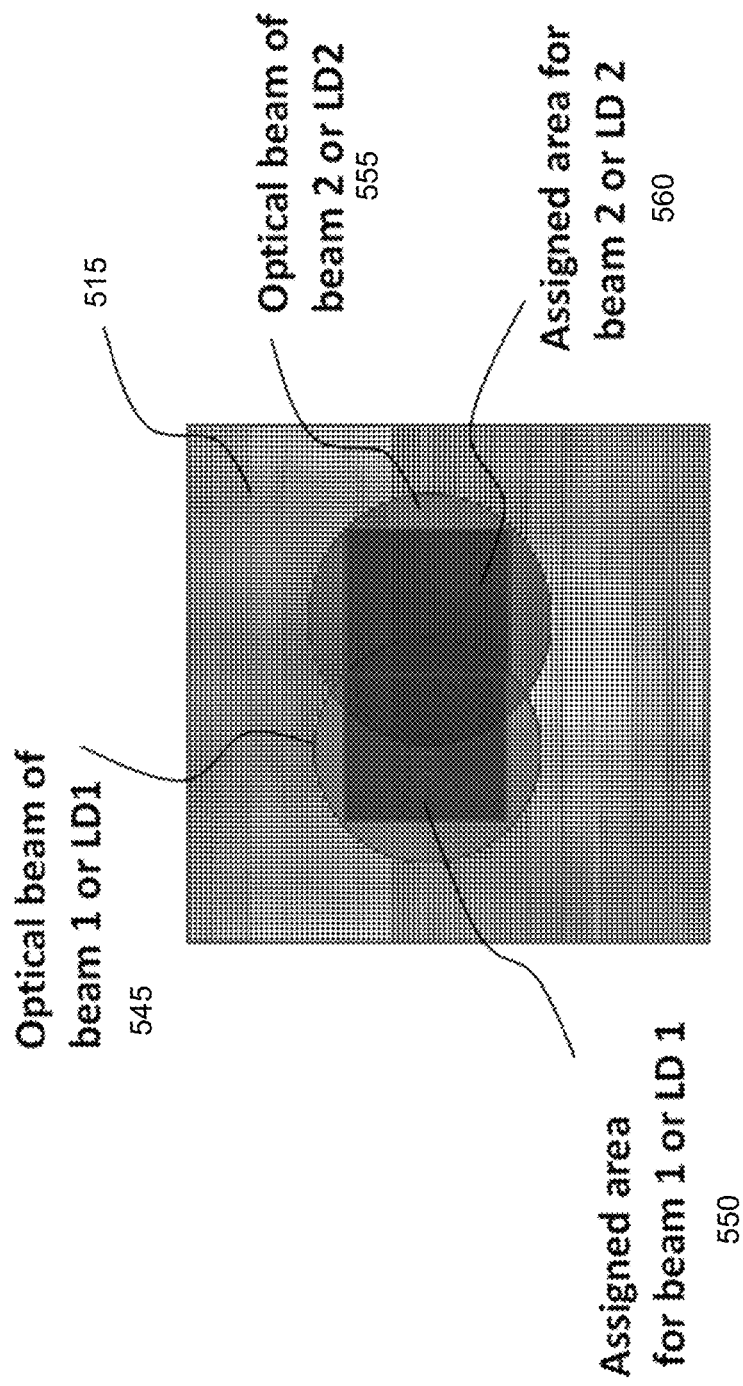
FIG. 5D illustrates an evaluation for overlapping illumination according to one or more aspects of the disclosed subject matter.

FIG. 5D illustrates an evaluation for overlapping illumination according to one or more aspects of the disclosed subject matter. The illumination overlapping on the modulator 515 from the neighboring LD does not affect the modulation of each area (e.g. area 550 and area 560) on the modulator 515 for each LD. In general, the illumination area (e.g., first optical beam 545, section optical beam 555) for each LD on the modulator 515 is larger than the assigned area (area 550, 560, respectively) on the modulator 515 in order to fully employ the energy from each LD. On the other hand, in some cases, the spatial coherence requirement might require expanding beam on the modulator. Accordingly, the light illuminated from one LD expanding to the area on the modulator assigned to another (neighboring) LD might not be avoided as shown in FIG. 5D. For example, the assigned modulator area for a first LD (area 550) is covered (i.e., illuminated) by light from the first LD (first optical beam 545). However, a portion of the area 550 is also illuminated by the light from the second LD (optical beam 555). When the evaluation of the scattering processing, or evaluation of the transmission matrix, is conducted, the optimization processing can automatically only consider the contribution from the light of first LD due to the global optimization of the evaluation itself, which means only consideration from the contribution from the first LD would give the maximum efficiency. Therefore, no specific treatment of the LD array is needed, and the unmodulated light in the overlapped area from the neighboring areas would only contribute as the background illumination on the localized illumination.

Additionally, it should be appreciated that one or more portions of the system 500 can be controlled by processing circuitry (e.g., similarly to the system 100). In other words, the processing circuitry of the system 100 can be applied in the implementation of the system 500. For example, the processing circuitry can be configured to control the modulator 515 to generate one localized illumination on a target object or a plurality of localized illuminations on the target object.

Figure 6:
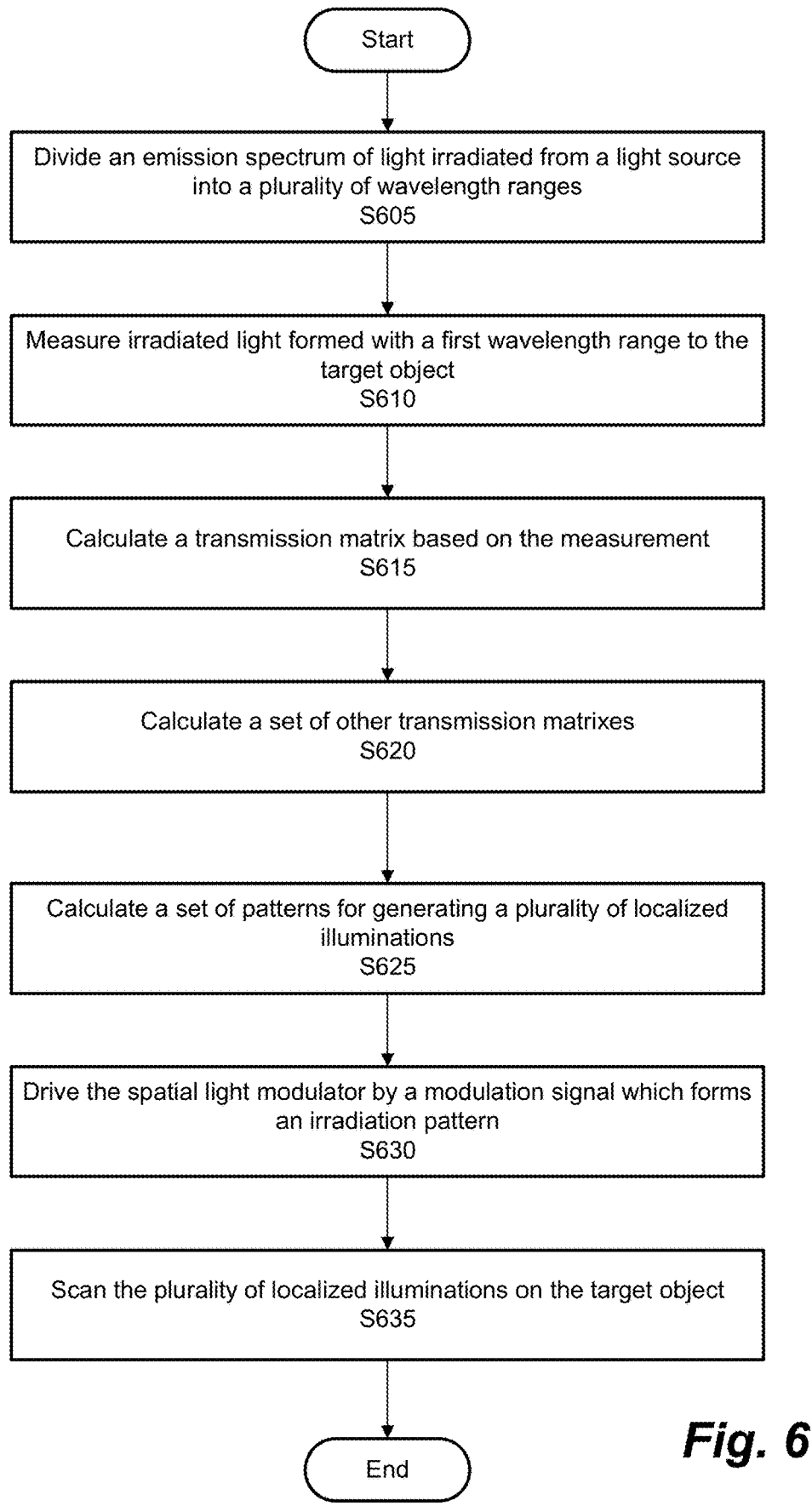
FIG. 6 is an algorithmic flow chart of a method for imaging a target object through a scattering medium according to one or more aspects of the disclosed subject matter.

FIG. 6 is an algorithmic flow chart of a method for imaging a target object through a scattering medium according to one or more aspects of the disclosed subject matter. For example, system 100 and/or system 500 can be implemented to modulate light configured to generate localized illuminations on a target object in and/or through a scattering medium for imaging.

In S605, the system 100 and/or system 500 can be configured to divide an emission spectrum of light irradiated from a light source (e.g., light source 105 and/or 505) into a plurality of wavelength ranges. In one aspect, the wavelength ranges can be +/−5 nm or +/−10 nm, for example. The emission spectrum can be dived by a spectral filter (e.g., spectral filter 7).

In S610, the system 100 and/or system 500 can be configured to measure irradiated light from the light source to the target object. The irradiated light can be formed with a first wavelength range via the modulator 110. The first wavelength range can correspond to the pump light (e.g., blue laser, LD), or any spectral component of the light.

In S615, the system 100 and/or system 500 can be configured to calculate a transmission matrix indicating a linear input and output response against the scattering medium. The calculation can be based on the measurement result (from S610) of the light intensity formed with the first wavelength range at a detector (e.g., detector 115).

In S620, the system 100 and/or system 500 can be configured to calculate a set of other transmission matrixes. Each of the other transmission matrixes can correspond to a transmission matrix of each wavelength range of the plurality of wavelength ranges based on the following formula:

$$TM2(\lambda 2) = a(n(\lambda 1)) TM1(\lambda 1) \quad \text{Equation 11}$$

where TM1 is the first transmission matrix, TM2 is the second transmission matrix, where n stands for the refractive index of the scattering medium, a is the relationship defined beforehand by experimental measurements or theoretical calculations based on the size of the modulator, range of the spatial coherence of the light source, and the type of the modulation, optical phase, or amplitude, which makes a(n) a constant depending on reflective index, which can be based on the material's relative permittivity and relative permeability. In other words, in a broadband source like white light, for everyday life application, the wavelength ranges from 400-700 nm. For a color sensor, or the human eye, the sensing unit, or pixel, can sense the light with different wavelengths. In principle, each sensing unit can include three sensing cells (or nerve cells) to sense different light of different wavelength. The components in the light of different wavelengths will fall into the corresponding sensing cells. However, white light can be divided into three components, red (R), green (G), and blue (B). Therefore, only three spectral components of the light can be used to form the white light. For example, blue light can be used in most cases as the pump source, or laser diode, as the first illumination source, to calculate the transmission matrix of the scattering medium. Then, the transmission matrix for red and green light components can be deduced. For example, the other transmission matrices can be deduced experimentally or theoretically. Experimentally, many experiments can be done at different conditions for the R, G, and B components in the light source. For example, a neural network model can be trained to find the relationship between the transmission matrices for blue and green as well as red light components, respectively. With this model, the TM for green and red light components can be induced from the measured TM for blue light. On the other hand, in principle, the relationship between the TMs for different spectral components can be acquired. The TM, from an output point of view, can be considered as the optimized field distributions (actually the conjugation of TM) for the localized illuminations on the target object. The distribution of the optical phase or amplitude is intended to form constructive interference at the position to form the localized illumination for the specific wavelength. Therefore, the distribution of phase or amplitude for different spectral components can be induced from the known field distribution based on the fact of that constructive interference is preserved when the wavelength changes or optical path lengths change.

In S625, the system 100 and/or system 500 can be configured to calculate a set of patterns for generating a plurality of localized illuminations. Each pattern can correspond to each of the plurality of wavelength ranges based on the other transmission matrixes. The set of patterns for generating the plurality of localized illuminations, where each pattern corresponding to each of the plurality of wavelength ranges, can be calculated as patterns for generating the plurality of localized illuminations so that light intensity on the plurality of localized illuminations is maximized on a virtual target based on a transmission matrix indicating input/output response of a first light intensity. The first light intensity can be measured by a detector (e.g., the detector 115) in response to irradiation of a plurality of patterns of the spatial light modulator (e.g., modulator 110 or modulator 515) on the virtual target located at predetermined distance from the detector and/or system 100, 500 and without a scattering medium. In other words, ballistic light can be used to capture images through a dynamic scattering medium (e.g., fog) using an illumination source like a headlight/headlamp in a vehicle by measuring the transmission matrix, calculating the transmission matrix, and calculating irradiation patterns in advance.

Further to the above description of the R, G, B components, the broadband source, or white light, illumination can be used to form colorful images of the target object. The target object reflects the broadband light with different reflectivity regarding the spectral components. When the detector (e.g., eyes, color camera CCD, etc.) receives and distinguishes the different components, a color image can be generated. In these cases, the different spectral components of the incident light illuminate the target object at the same time, and the different reflected spectral components fall onto the different sensing cells on the detectors.

In one aspect, for the situation of scattering control processing, the modulator could not display the field distributions for all three light components at the same time. One option can be that the modulator (e.g., modulator 110 or modulator 515) can operate to generate the acquired field distributions for the different spectral components at different times, or one after the other, while the detector receives the images of the localized illuminations on the target objects at the different times. Another option can be that the pixels on the modulator can be formed into elements in which different pixels are designed to operate for the different spectral components, or RGB, which can be the same operation principle of a color camera.

The information corresponding to the irradiation pattern on the virtual target located at the predetermined distance can be stored in memory (e.g., local memory in the processing circuitry 130, a remote database, etc.), and the system 100 and/or system 500 can be configured to irradiate the irradiation pattern retrieved from the memory for generating the plurality of localized illuminations on the target object in response to a signal detecting fog, for example. Additionally, the memory can be configured to store a plurality of irradiation patterns corresponding to a plurality of predetermined distances.

In S630, the system 100 and/or system 500 can be configured to drive the spatial light modulator by a modulation signal which forms an irradiation pattern. The irradiation pattern can be configured generate the plurality of localized illuminations where each of the localized illuminations can be arranged in a matrix on the target object based on the calculated patterns corresponding to the wavelength ranges. The irradiation pattern can be formed by switching the set of patterns for generating the plurality of localized illuminations where each pattern corresponds to each of the plurality of wavelength ranges. For example, the switching can correspond to switching between a pattern for generating localized illuminations for blue light and a pattern for generating localized illuminations for yellow light at the spatial light modulator in the case of light source of white light generated by blue light and yellow light. In this case, the light irradiating to the spatial light modulator (the light for irradiating on the target object) can be either of white light and wavelength light according to the patterns for generating localized illuminations (e.g., irradiating blue light in case of generating localized illuminations for blue light and irradiating yellow light in case of for generating localized illuminations for yellow light). Further, the irradiation pattern can be irradiated with time division by the set of patterns for generating the plurality of localized illuminations where each pattern corresponds to each of the plurality of wavelength ranges. Further, in one aspect, the irradiation pattern can be a combined pattern calculated based on the set of patterns for generating the plurality of localized illuminations where each pattern corresponds to each of the plurality of wavelength ranges.

In S635, the system 100 and/or system 500 can be configured to scan the plurality of localized illuminations on the target object. The scan can be based on the pattern for generating the plurality of localized illuminations.

In the above descriptions of FIGS. 2, 3, and 6, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The various elements, features, and processes described herein may be used independently of one another or may be combined in various ways. All possible combinations and sub-combinations are intended to fall within the scope of this disclosure.

Figure 7:
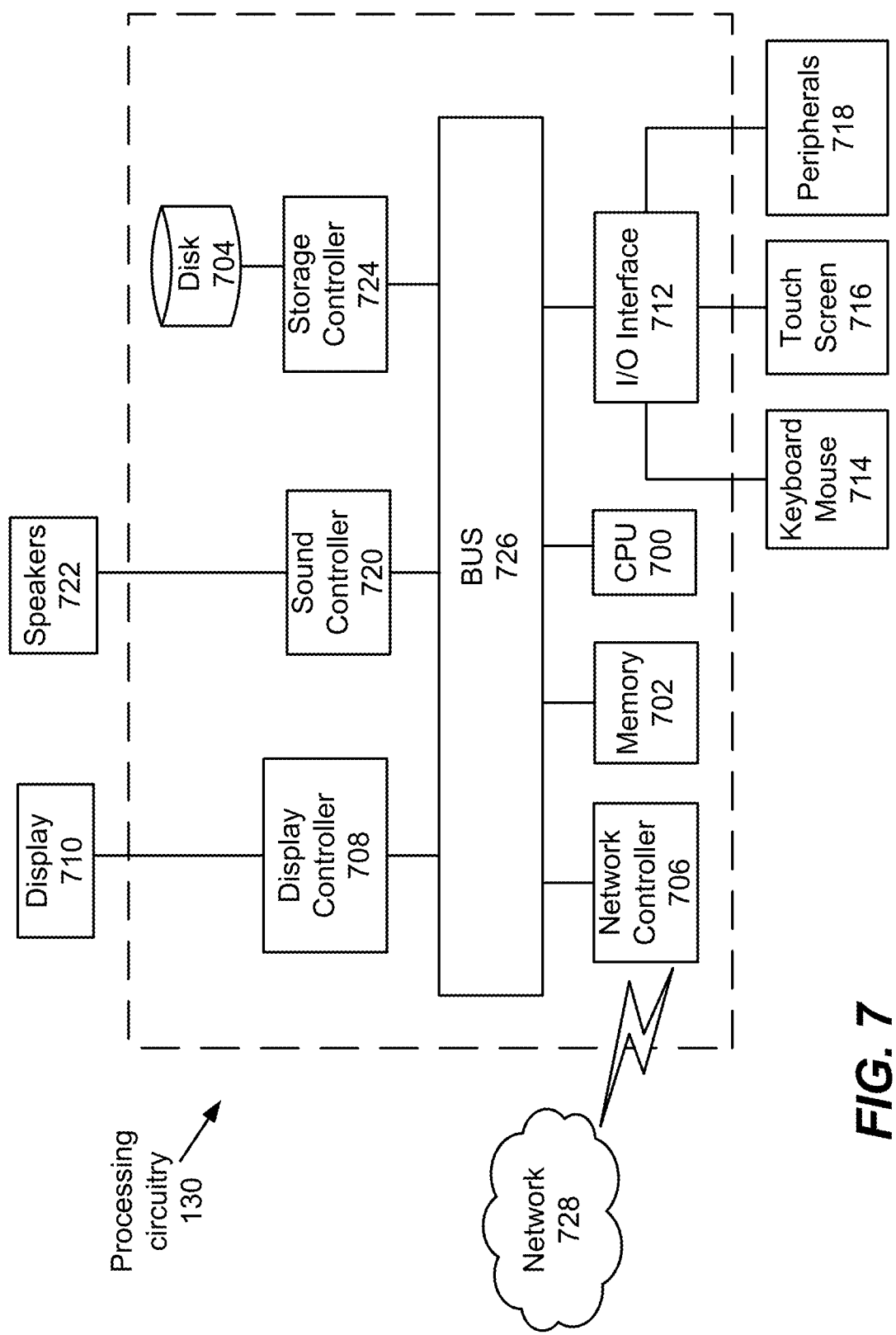
FIG. 7 is a hardware block diagram of processing circuitry according to one or more exemplary aspects of the disclosed subject matter.

Next, a hardware description of a computer/device (such as the processing circuitry 130) according to exemplary embodiments is described with reference to FIG. 7. The hardware description described herein can also be a hardware description of the processing circuitry 130. In FIG. 7, the processing circuitry 130 includes a CPU 700 which performs one or more of the processes described above/below. The process data and instructions may be stored in memory 702. These processes and instructions may also be stored on a storage medium disk 704 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing circuitry 130 communicates, such as a server or computer.

Further, the claimed advancements may be provided as a utility application, background daemon, or component of an operating system, or combination thereof, executing in conjunction with CPU 700 and an operating system such as Microsoft Windows, UNIX, Solaris, LINUX, Apple MAC-OS and other systems known to those skilled in the art.

The hardware elements in order to achieve the processing circuitry 130 may be realized by various circuitry elements. Further, each of the functions of the above described embodiments may be implemented by circuitry, which includes one or more processing circuits. A processing circuit includes a particularly programmed processor, for example, processor (CPU) 700, as shown in FIG. 7. A processing circuit also includes devices such as an application specific integrated circuit (ASIC) and conventional circuit components arranged to perform the recited functions.

In FIG. 7, the processing circuitry 130 includes a CPU 700 which performs the processes described above. The processing circuitry 130 may be a general-purpose computer or a particular, special-purpose machine. In one embodiment, the processing circuitry becomes a particular, special-purpose machine when the processor 700 is programmed to perform imaging in and through a scattering medium (and in particular, any of the processes discussed with reference to FIGS. 2, 3, and 6).

Alternatively, or additionally, the CPU 700 may be implemented on an FPGA, ASIC, PLD or using discrete logic circuits, as one of ordinary skill in the art would recognize. Further, CPU 700 may be implemented as multiple processors cooperatively working in parallel to perform the instructions of the inventive processes described above.

The processing circuitry 130 in FIG. 7 also includes a network controller 706, such as an Intel Ethernet PRO network interface card from Intel Corporation of America, for interfacing with network 728. As can be appreciated, the network 728 can be a public network, such as the Internet, or a private network such as an LAN or WAN network, or any combination thereof and can also include PSTN or ISDN sub-networks. The network 728 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The processing circuitry 130 further includes a display controller 708, such as a graphics card or graphics adaptor for interfacing with display 710, such as a monitor. A general purpose I/O interface 712 interfaces with a keyboard and/or mouse 714 as well as a touch screen panel 716 on or separate from display 710. General purpose I/O interface also connects to a variety of peripherals 718 including printers and scanners.

A sound controller 720 is also provided in the processing circuitry 130 to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the processing circuitry 130. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A lighting system, comprising:
a light source having a broad emission spectrum;
a spatial light modulator configured to modulate one or more of phase and amplitude of light irradiated from the light source to a target object;
a detector configured to detect light intensity being reflected from the target object; and
circuitry configured to
divide the broad emission spectrum of the light source into a plurality of wavelength ranges,
measure intensities of irradiated light formed with a first wavelength range to the target object,
calculate a first transmission matrix based on the measurement,
calculate transmission matrixes for the plurality of wavelength ranges based on the first transmission matrix,
calculate field distributions for generating a plurality of localized illuminations based on the transmission matrixes for the plurality of wavelength ranges,
drive the spatial light modulator by modulation signals for irradiation patterns corresponding to the field distributions, and
scan certain localized illuminations formed by the modulation signals on the target object.

2. The lighting system of claim 1, wherein the irradiation patterns are formed by switching the field distributions, each of the field distributions corresponding to each of the plurality of wavelength ranges.

3. The lighting system according to claim 2, wherein the irradiation patterns are irradiated with time division by the field distributions, each of the field distributions is corresponding to each of the plurality of wavelength ranges.

4. The lighting system according to claim 1, wherein the irradiation patterns are combined patterns calculated based on the field distributions, each of the field distributions corresponding to each of the plurality of wavelength ranges.

5. The lighting system according to claim 1, wherein the first wavelength range is a part of the emission spectrum.

6. The lighting system according to claim 1, further comprising:
a spectral filter, the spectral filter being disposed between the light source and the modulator.

7. The lighting system according to claim 1,
wherein the detector includes a first detector and a second detector,
wherein the first detector detects the light intensity reflected by the target object irradiated from the light source, and
wherein the second detector detects light intensity of the first wavelength range which is reflected by the target object.

8. The lighting system according to claim 1, wherein the circuitry is further configured to
capture images of the target object corresponding to the localized illuminations, and
generate an image of the target object based on the captured images.

9. The lighting system according to claim 1, wherein the field distributions are based on the measurement of the first wavelength range at a predetermined distance from the lighting system without scattering medium.

10. The lighting system according to claim 9, wherein the processing is further configured to
store information of the irradiation patterns corresponding to the field distributions calculated in advance, and
irradiate the irradiation pattern retrieved from storage corresponding to a predetermined distance of the target object.

11. The lighting system according to claim 9, wherein the processing circuitry is further configured to
store a plurality of irradiation patterns corresponding to a plurality of predetermined distances.

12. The lighting system according to claim 1,
wherein a spatial coherence of the irradiated light to the spatial light modulator among light from the light source is determined according to the following mathematical formula:

$$|v| = \left|\mathrm{sinc}\left(\frac{\pi dS}{\lambda R}\right)\right|$$

where v is visibility of interference pattern and the v being equal or larger than 0.8, the S being a size of irradiation from the light source, the d being distance between elements of the spatial light modulator, and the R being distance between the light source and the spatial light modulator.

13. A method for imaging a target object through a scattering medium, comprising:
dividing an emission spectrum of light source into a plurality of wavelength ranges;
measure intensities of irradiated light formed with a first wavelength range to a target object;
calculating a first transmission matrix based on the measurement;
calculating transmission matrixes for the plurality of wavelength ranges based on the first transmission matrix;
calculating field distributions for generating a plurality of localized illuminations based on the first transmission matrixes for the plurality of wavelength ranges;
driving the spatial light modulator by modulation signals for irradiation patterns corresponding to the field distributions; and
scanning certain localized illuminations formed by the modulation signals on the target object.

14. The method of claim 13, wherein the irradiation patterns are formed by switching the field distributions, each of the field distributions corresponding to each of the plurality of wavelength ranges.

15. The method of claim 13, further comprising:
capturing images of the target object corresponding to the localized illuminations; and
generating an image of the target object based on the captured images.

16. The method of claim 13, further comprising:
storing information corresponding of the irradiation patterns corresponding to the field distributions calculated in advance; and
irradiating the irradiation pattern retrieved from storage corresponding to a predetermined distance of the target object.

17. The method of claim 13, further comprising:
storing a plurality of irradiation patterns corresponding to a plurality of predetermined distances.

18. The method of claim 13, further comprising:
detecting, by a first detector, light intensity reflected by the target object irradiated from the light source; and
detecting, by a second detector, light intensity of the first wavelength range which is reflected by the target object.

\* \* \* \* \*